United States Patent
Chang et al.

(10) Patent No.: US 9,291,849 B2
(45) Date of Patent: Mar. 22, 2016

(54) LIQUID CRYSTAL DISPLAY

(71) Applicant: Samsung Display Co., Ltd., Yongin-City, Gyeonggi-Do (KR)

(72) Inventors: Jong Woong Chang, Asan-si (KR); Dong Ho Shin, Seongnam-si (KR); Yun Tae Lee, Seoul (KR)

(73) Assignee: SAMSUNG DISPLAY CO., LTD. (KR)

( * ) Notice: Subject to any disclaimer, the term of this patent is extended or adjusted under 35 U.S.C. 154(b) by 99 days.

(21) Appl. No.: 14/297,458

(22) Filed: Jun. 5, 2014

(65) Prior Publication Data

US 2015/0015838 A1    Jan. 15, 2015

(30) Foreign Application Priority Data

Jul. 12, 2013  (KR) .................. 10-2013-0082384

(51) Int. Cl.
*G02F 1/1343* (2006.01)
*G02F 1/1335* (2006.01)
*G02F 1/1339* (2006.01)
*G02F 1/1362* (2006.01)

(52) U.S. Cl.
CPC ...... *G02F 1/133512* (2013.01); *G02F 1/13394* (2013.01); *G02F 1/134363* (2013.01); *G02F 1/136227* (2013.01)

(58) Field of Classification Search
CPC .................. G02F 1/134363; G02F 1/136286; G02F 1/1368; G02F 1/136227; G02F 1/134309; G02F 1/133345; G02F 1/133512; G02F 1/134336; G02F 1/1362; G02F 1/133514; G02F 1/13394; G02F 1/1339; G02F 1/1343; G02F 1/136209; G02F 1/136213; G02F 1/133711; G02F 2001/134372; G02F 2001/134318; G02F 2001/13629; G02F 2001/133357; G02F 2001/133519; G02F 2001/1635; G02F 2201/123; H01L 29/786; H01L 27/3262; H01L 27/3276; H01L 27/3218; H01L 27/3248; H01L 27/3272; G09G 2300/0426; G09G 2300/0434; G09G 2300/0443; G09G 2300/0452; G09G 2300/08; G09G 3/3648
USPC .............. 257/59, 390; 349/43, 138, 143, 141, 349/155, 42, 110, 106, 139, 144, 38, 41, 349/44; 438/158, 151, 585; 345/103, 87
See application file for complete search history.

(56) References Cited

U.S. PATENT DOCUMENTS

| 6,856,371 | B2 | 2/2005 | Kim et al. |
| 8,102,496 | B2 | 1/2012 | Kim |
| 2004/0012485 | A1 | 1/2004 | Sundqvist |
| 2006/0100967 | A1 | 5/2006 | Grimaldi et al. |

(Continued)

FOREIGN PATENT DOCUMENTS

| KR | 10-2003-0027203 | 4/2003 |
| KR | 10-2012-0075034 | 7/2012 |

(Continued)

*Primary Examiner* — Thoi Duong
(74) *Attorney, Agent, or Firm* — Innovation Counsel LLP

(57) ABSTRACT

Provided is a liquid crystal display including: a first substrate; a gate line, a data line, and a common voltage line formed on the first substrate; a first passivation layer formed on the gate line, the data line, and the common voltage line; and a pixel electrode and a common electrode formed on the first passivation layer and overlapping each other with a second passivation layer therebetween, and the common electrode is connected to the common voltage line through a common contact hole, and the common contact hole is disposed for every two or more dots.

28 Claims, 17 Drawing Sheets

(56) References Cited

U.S. PATENT DOCUMENTS

2010/0225569 A1 9/2010 Park et al.
2011/0050551 A1* 3/2011 Ota .................. G02F 1/134363
345/87

FOREIGN PATENT DOCUMENTS

KR 10-2013-0007902 1/2013
KR 10-2013-0030146 3/2013

* cited by examiner

LIQUID CRYSTAL DISPLAY

CROSS-REFERENCE TO RELATED APPLICATION

This application claims priority to and the benefit of Korean Patent Application No. 10-2013-0082384 filed in the Korean Intellectual Property Office on Jul. 12, 2013, the entire contents of which are incorporated herein by reference.

BACKGROUND (a) Technical Field

Embodiments of the present invention relate to a liquid crystal display.

(b) Description of the Related Art

A liquid crystal display, which is one of the most common types of flat panel displays currently in use, is a display device which rearranges liquid crystal molecules of a liquid crystal layer by applying voltages to electrodes to control an amount of transmitted light.

The liquid crystal display has an advantage of easily forming a thin display, but has a disadvantage in that side visibility deteriorates compared with front visibility. In order to solve the disadvantage, various types of alignments of the liquid crystal and driving methods have been developed. For example, a display implementing an In-Plane Switching (IPS) technology or a Plane to Line Switching (PLS) technology having a wide viewing angle is widely used as a display of various electronic devices. In an IPS or a PLS devices, a pixel electrode and a common electrode are formed on one substrate, a TFT substrate.

In order to connect a common voltage line supplying a common voltage to the common electrode in the TFT substrate, contact holes are formed via an insulating layer in the TFT substrate.

An upper panel and a lower panel (a TFT substrate) of the liquid crystal display are supported by a column spacer spacers disposed between the two panels to maintain a cell gap.

In order to prevent light leakage due to the column spacer, the column spacer is covered by an opaque member.

Owing to the contact holes formed in the insulating layer and the opaque member for covering the column spacer, an aperture ratio of the liquid crystal display is deteriorated.

The above information disclosed in this Background section is only for enhancement of understanding of the background of the invention and therefore it may contain information that does not form the prior art that is already known in this country to a person of ordinary skill in the art.

SUMMARY

The present invention has been made in an effort to provide a liquid crystal display having advantages of preventing an aperture ratio of the liquid crystal display from deteriorating while electrically connecting a common voltage line transferring a common voltage to a common electrode to the common electrode and uniformly controlling a cell gap between an upper substrate and a lower substrate.

An exemplary embodiment of the present invention provides a liquid crystal display, including: a first substrate; a gate line, a data line, and a common voltage line formed on the first substrate; a first passivation layer formed on the gate line, the data line, and the common voltage line; and a pixel electrode and a common electrode formed on the first passivation layer and overlapping a second passivation layer therebetween, wherein the common electrode is connected to the common voltage line through common contact holes, and the common contact holes are disposed for every two or more dots.

The liquid crystal display may further include a second substrate facing the first substrate; and column spacers maintaining a cell gap between the first substrate and the second substrate, and the common contact holes may be formed to be adjacent to the column spacers.

The liquid crystal display may further include light blocking members overlapping the column spacers, and the common contact holes may overlap the light blocking members.

The common voltage line may be disposed between the two gate lines adjacent to each other, and distances between the common voltage line and two the gate lines may almost be substantially the same as each other.

The common voltage line may include protrusions exposed by the common contact holes, the data line may include a plurality of data lines, the common voltage line may include a plurality of common voltage lines, and the protrusions of the common voltage lines disposed in adjacent pixel rows may overlap different data lines.

The common voltage line may include a first extension and a second extension extending to be parallel to the data line, the first extension may be disposed at a left side of the data line, and the second extension may be disposed at a right side of the data line.

The common voltage line may further include a third extension and a fourth extension extending to be parallel to the data line, the first extension and the third extension may be disposed at the left side of the data line, the second extension and the fourth extension may be disposed at the right side of the data line, the first extension and the second extension may extend upward along the data line from the common voltage line, and the third extension and the fourth extension may extend downward along the data line from the common voltage line.

The first extension, the second extension, the third extension and the fourth extension may have a bent portion.

The first extension may extend upward or downward along the data line from the common voltage line, and the second extension may extend in an opposite direction to the extending direction of the first extension.

The common voltage line may further include a connection portion extending toward the common contact hole, and the connection portion may include a first vertical portion disposed at a left side of the data line, a second vertical portion disposed at a right side of the data line, and a horizontal portion connecting the first vertical portion and the second vertical portion.

The common voltage line may include a first extension and a second extension extending to be parallel to the data line, widths of the first extension and the second extension may be larger than a width of the data line, the first extension may extend upward or downward along the data line from the common voltage line, the second extension may extend in an opposite direction to the extending direction of the first extension and the common voltage line overlap the data.

The liquid crystal display may further include a blocking layer overlapping the data line, floated, and formed on the same layer as the common voltage line, and a width of the blocking layer may be larger than a width of the data line.

The liquid crystal display may further include a first extension disposed on a first side of the data line and disposed between the data line and the pixel electrode. The first extension may include a connecting portion extending substantially parallel to the data line and overlapping the data line, and a protrusion formed on an end portion of the first extension and exposed by the common contact hole, the protrusion being formed adjacent to a column spacer.

The liquid crystal display may further include a second extension disposed on a second side of the data line and extending opposite direction to the first extension. The second extension may extend substantially parallel to the data line and overlapping the data line. According to the exemplary embodiment of the present invention, it is possible to prevent an aperture ratio of the liquid crystal display from deteriorating while electrically connecting a common voltage line transferring a common voltage to a common electrode to the common electrode and uniformly controlling a cell gap between an upper substrate and a lower substrate.

DETAILED DESCRIPTION OF THE EMBODIMENTS

Figure 1A:
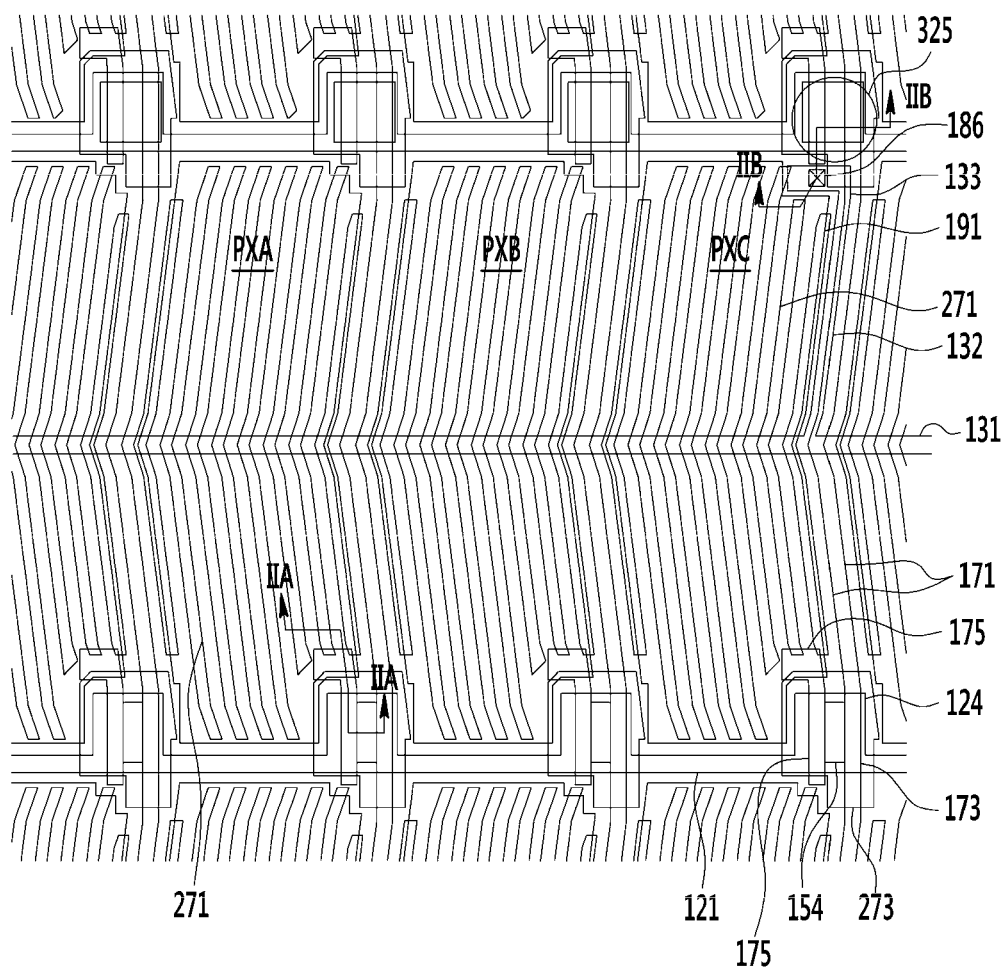
FIG. 1A is a layout view illustrating some pixels of a liquid crystal display according to an exemplary embodiment of the present invention.

Hereinafter, embodiments of the present invention will be described in detail with reference to the accompanying drawings, in which exemplary embodiments of the invention are shown. As those skilled in the art would realize, the described embodiments may be modified in various different ways without departing from the spirit or scope of the inventive concept.

In the drawings, the thickness of layers, films, panels, regions, etc., may have been exaggerated for clarity. Like reference numerals designate like elements throughout the specification. It will be understood that when an element such as a layer, film, region, or substrate is referred to as being "on" another element, it can be formed directly on the other element or formed on the another element with one or more intervening elements therebetween. In contrast, when an element is referred to as being "directly on" another element, there are no intervening elements present.

Figure 1B:
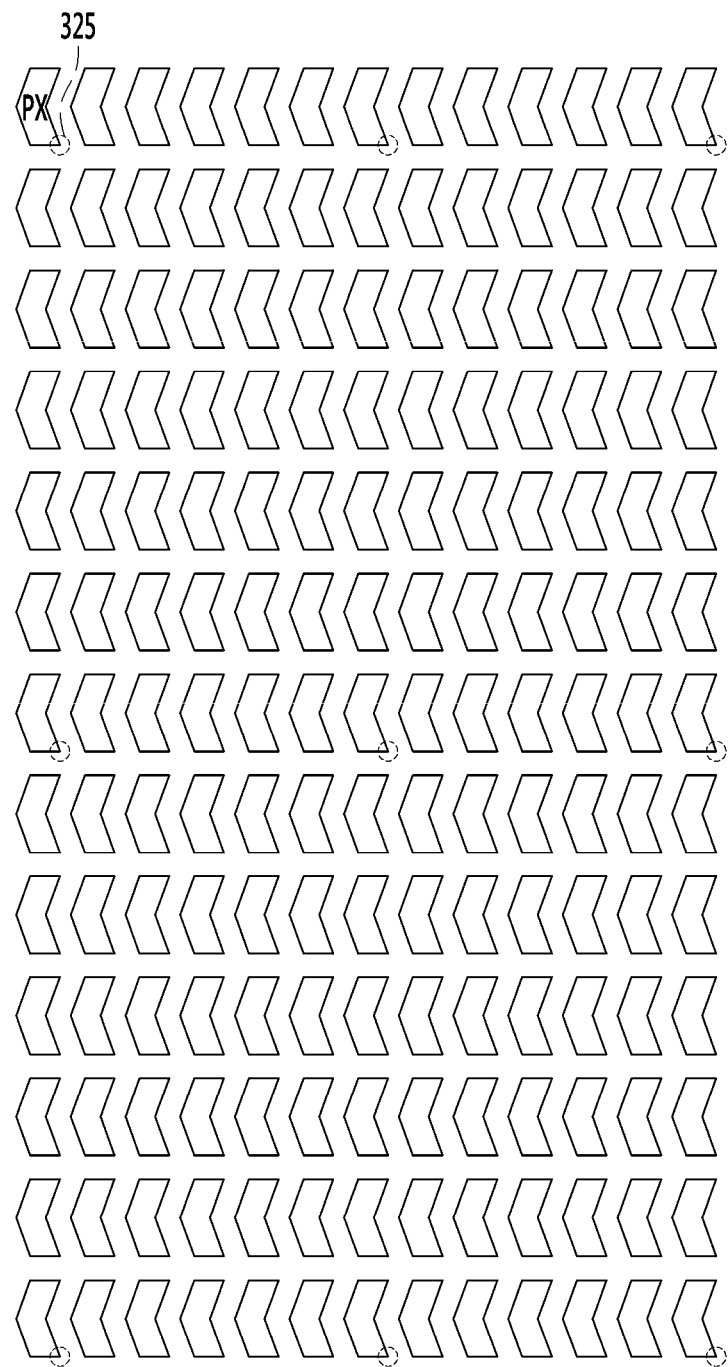
FIG. 1B is a simple layout view illustrating some pixels of a liquid crystal display according to an exemplary embodiment of the present invention.
Figure 2A:
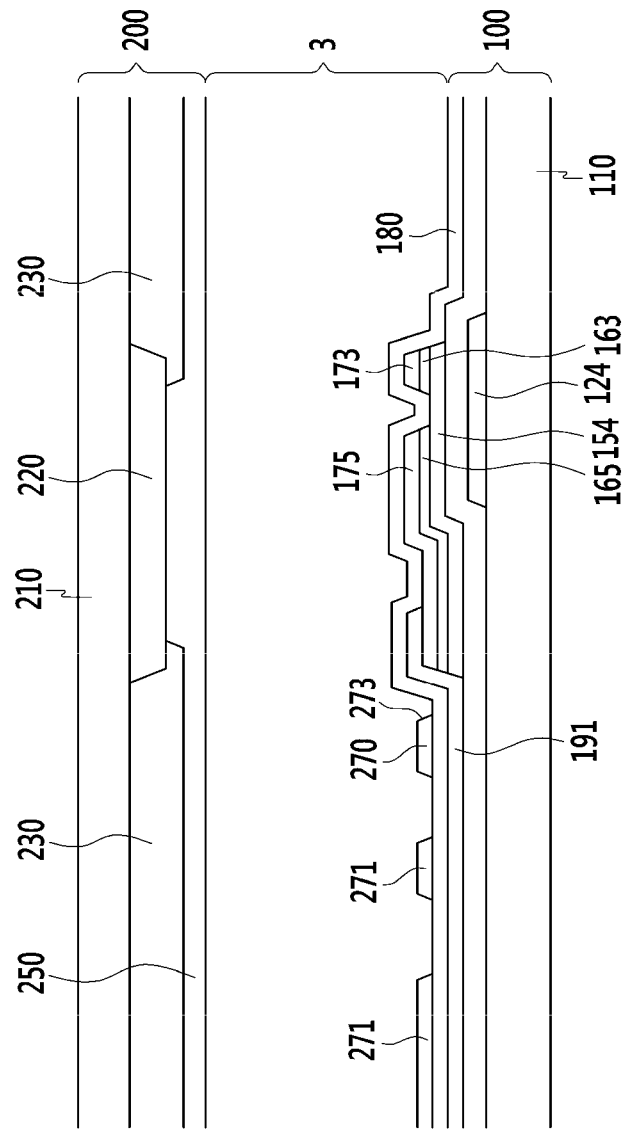
FIG. 2A is a cross-sectional view of the liquid crystal display of FIG. 1A taken along line IIA-IIA.
Figure 2B:
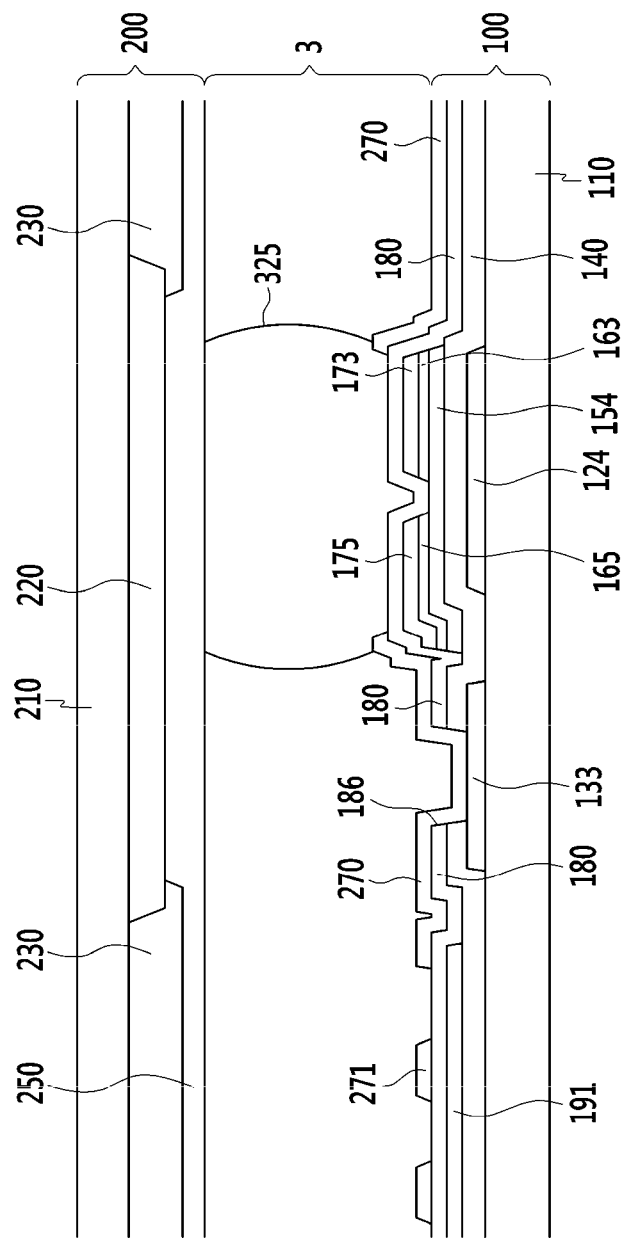
FIG. 2B is a cross-sectional view of the liquid crystal display of FIG. 1A taken along line IIB-IIB.
Figure 3:
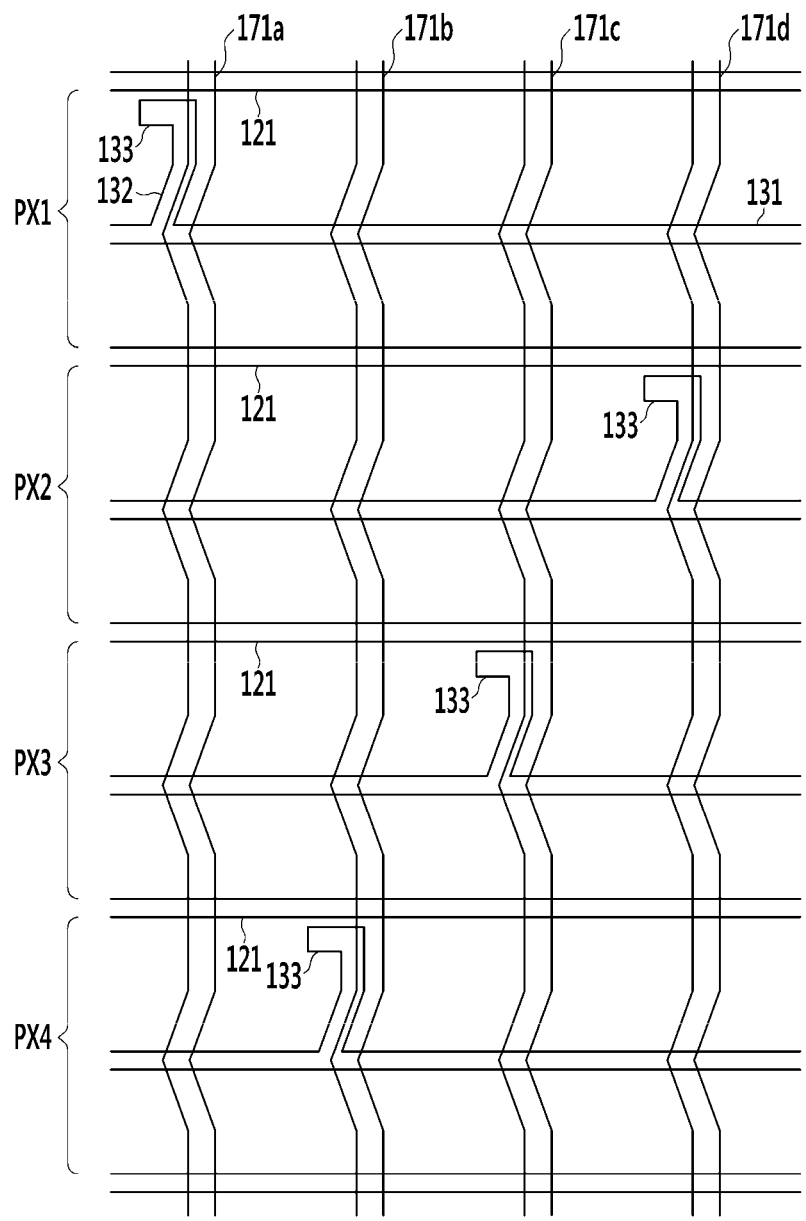
FIG. 3 is a layout view illustrating some of signal lines of the liquid crystal display according to the exemplary embodiment of the present invention.

A liquid crystal display according to an exemplary embodiment of the present invention will be described with reference to FIGS. 1A to 3. FIG. 1A is a layout view illustrating some pixels of a liquid crystal display according to an exemplary embodiment of the present invention, FIG. 1B is a simple layout view illustrating some pixels of a liquid crystal display according to an exemplary embodiment of the present invention, FIG. 2A is a cross-sectional view of the liquid crystal display of FIG. 1 taken along line IIA-IIA, and FIG. 2B is a cross-sectional view of the liquid crystal display of FIG. 1 taken along line IIB-IIB. FIG. 3 is a layout view illustrating some of signal lines of the liquid crystal display according to the exemplary embodiment of the present invention.

Referring to FIG. 1A, the liquid crystal display according to the exemplary embodiment of the present invention may include a plurality of pixels PXA, PAB, and PXC adjacent to each other. The plurality of pixels PXA, PAB, and PXC may display different colors and forms one dot. In the illustrated exemplary embodiment, one dot has three pixels, but in a liquid crystal display according to another exemplary embodiment of the present invention, one dot may have three or more pixels.

The plurality of pixels PXA, PAB, and PXC includes a gate line 121, a common voltage line 131, a plurality of data lines 171, a pixel electrode 191, and a common electrode 270.

The common voltage line 131 has a protrusion 133. A common contact hole 186 for connecting the common voltage line 131 with the common electrode 270 is formed to expose a portion of the protrusion 133 through a passivation layer 180 and a gate insulating layer 140. The contact hole 186 is formed to be adjacent to a column spacer 325. The column spacer may be a main column spacer which mainly maintain a cell gap between two substrates.

By forming the contact hole 186 to be adjacent to the column spacer 325, the contact hole 186 may be covered by a light blocking member 220 which overlaps the column spacer 325. Accordingly, an additional light blocking member for covering the common contact hole 186 which connects the common voltage line 131 and the common electrode 270 may not be required. Therefore, without deteriorating the aperture ratio of the liquid crystal display, the common contact hole 186 for connecting the common voltage line 131 and the common electrode 270 may be formed.

The column spacer 325 serves to uniformly maintain a gap between two substrates facing each other, that is, the cell gap.

The protrusion 133 may be formed corresponding to the column spacer. One protrusion 133 of the common voltage line 131, one common contact hole 186, and one column spacer 325 may be formed for every two or more dots and every six or more pixel (PX) columns along a row direction and for every two or more dots and every six or more pixel (PX) rows along a column direction shown in FIG. 1B. In detail, one protrusion 133 of the common voltage line 131, one common contact hole 186, and one column spacer 325 may be formed for every six or more pixels along a row direction and every six or more pixels along a column direction.

By forming one protrusion 133 of the common voltage line 131 for every two or more dots along a row direction and along a column direction, an aperture ratio of the liquid crystal display may be prevented from deteriorating due to the common contact hole 186 for connecting the common voltage line 131 and the common electrode 270.

A structure of one pixel of the liquid crystal display according to the exemplary embodiment of the present invention will be described in more detail with reference to FIGS. 1A, 1B, 2A, and 2B.

Referring to FIGS. 1A, 1B, 2A, and 2B, the liquid crystal display according to the exemplary embodiment of the present invention includes a lower panel 100 and an upper panel 200 facing each other, and a liquid crystal layer 3 disposed between the two panels 100 and 200.

The lower panel 100 includes a gate conductor. The gate conductor including a gate line 121 and a common voltage line 131 is formed on a first insulation substrate 110 made of transparent glass or plastic.

The gate line 121 includes a gate electrode 124 and a wide gate pad portion (not illustrated) for connection with another layer or an external driving circuit. The gate line 121 may be made of aluminum-based metal such as aluminum (Al) or an aluminum alloy, silver-based metal such as silver (Ag) or a silver alloy, copper-based metal such as copper (Cu) or a copper alloy, molybdenum-based metal such as molybdenum (Mo) or a molybdenum alloy, chromium (Cr), tantalum (Ta), and titanium (Ti). However, the gate line 121 may have a multilayered structure including at least two conductive layers having different physical properties.

The common voltage line 131 is disposed between two adjacent gate lines 121, and distances between the common voltage line 131 and the two adjacent gate lines 121 may almost be the same as each other. Accordingly, the common voltage line 131 may be formed to pass through a center of a pixel area and extend substantially parallel to the gate line 121.

The common voltage line 131 includes a connection portion 132 extending along a data line 171 to be described below and a protrusion 133 formed at the end of the connection portion 132.

The protrusion 133 of the common voltage line 131 is connected to the common electrode 270 through a common contact hole 186 to be described below.

The connection portion 132 and the protrusion 133 of the common voltage line 131 may be formed for every a plurality of pixels, and may be formed for every two or more dots and every six or more pixels along a row direction and along a column direction. In detail, the connection portion 132 and the protrusion 133 of the common voltage line 131 may be formed for every six or more pixels along a row direction and along a column direction.

A gate insulating layer 140 made of silicon nitride (SiNx) or silicon oxide (SiOx) is formed on the gate conductor 121 and 131. The gate insulating layer 140 may have a multilayered structure including at least two insulating layers having different physical properties.

A semiconductor 154 made of amorphous silicon or polysilicon is formed on the gate insulating layer 140. The semiconductor 154 may include an oxide semiconductor.

Ohmic contacts 163 and 165 are formed on the semiconductor 154. The ohmic contacts 163 and 165 may be made of a material such as n+ hydrogenated amorphous silicon in which n-type impurity such as phosphorus is doped at a high concentration or silicide. The ohmic contacts 163 and 165 may be disposed on the semiconductor 154 to make a pair. In the case where the semiconductor 154 is an oxide semiconductor, the ohmic contacts 163 and 165 may be omitted.

A data conductor including a data line 171 which includes a source electrode 173 and a drain electrode 175 is disposed on the ohmic contacts 163 and 165 and the gate insulating layer 140.

The data line 171 may include a data pad portion (not illustrated) for connection with another layer or an external driving circuit. The data line 171 transfers a data signal and mainly extends in a vertical direction to cross the gate line 121.

The data line 171 may have a first bent portion in order to obtain maximum transmittance of the liquid crystal display, and the first bent portion may have a V-shape in which the bent portion is disposed on a middle region of a pixel area. A second bent portion which is bent to form a predetermined angle with the first bent portion may be further included in the middle region of the pixel area.

The first bent portion of the data line 171 may be bent to form an angle of about 7° with a vertical reference line which forms an angle of 90° with an extending direction of the gate line 121. The second bent portion disposed in the middle region of the pixel area may be further bent to form an angle of about 7° to about 15° with the first bent portion.

The source electrode 173 is a part of the data line 171 and disposed on the same layer as the data line 171. The drain electrode 175 is formed to extend in parallel to the source electrode 173. Accordingly, the drain electrode 175 is parallel with the part of the data line 171.

The gate electrode 124, the source electrode 173, and the drain electrode 175 form one thin film transistor (TFT) together with the semiconductor 154. A channel of the thin film transistor is configured to be formed in the semiconductor 154 between the source electrode 173 and the drain electrode 175.

The liquid crystal display according to the exemplary embodiment of the present invention includes the source electrode 173 disposed on the same layer as the data line 171, and the drain electrode 175 extending in parallel with the data line 171. As a result, a channel width of the thin film transistor may be increased without increasing an area of the data conductor. Thereby increase in an aperture ratio of the liquid crystal display may be realized.

However, in the case of a liquid crystal display according to another exemplary embodiment of the present invention, the source electrode 173 and the drain electrode 175 may have different shapes.

The data line 171 and the drain electrode 175 may be made of refractory metal such as molybdenum, chromium, tantalum, and titanium or an alloy thereof, and may have a multi-layered structure including a refractory metal layer (not illustrated) and a low resistive conductive layer (not illustrated). An example of the multilayered structure may include a double layer including a chromium or molybdenum (alloy) lower layer and an aluminum (alloy) upper layer, and a triple layer including a molybdenum (alloy) lower layer, an aluminum (alloy) intermediate layer, and a molybdenum (alloy)

upper layer. However, the data line 171 and the drain electrode 175 may be made of various metals or conductors besides the metals.

A pixel electrode 191 is formed on a part of the drain electrode 175 and the gate insulating layer 140.

The pixel electrode 191 includes a pair of curved edges which are substantially parallel with the first bent portion and the second bent portion of the data line 171.

The pixel electrode 191 covers a part of the drain electrode 175 to be disposed on the drain electrode 175, and is electrically connected to the drain electrode 175.

The pixel electrode 191 may be made of polycrystalline, monocrystalline, or amorphous transparent conductive material, such as indium tin oxide (ITO), indium zinc oxide (IZO), or the like.

A passivation layer 180 is formed on the data conductor 171 and 175, the exposed semiconductor 154, and the pixel electrode 191.

The passivation layer 180 is made of an inorganic insulator such as silicon nitride and silicon oxide. However, the passivation layer 180 may be made of an organic insulator, and a surface of the passivation layer 180 may be flat. The organic insulator may have photosensitivity, and a dielectric constant thereof may be about 4.0 or less. The passivation layer 180 may have a double layer structure of a lower inorganic layer and an upper organic layer so as not to damage the exposed semiconductor 154 portion while maintaining an excellent insulating characteristic of the organic layer.

A contact hole (not illustrated) exposing the data pad portion is formed in the passivation layer 180, and a common contact hole 186 exposing the protrusion 133 of the common voltage line 131 is formed in the passivation layer 180 and the gate insulating layer 140.

A common electrode 270 is formed on the passivation layer 180. The common electrode 270 overlaps the pixel electrode 191 and includes a plurality of branch electrodes 271. The common electrode 270 may be made of a polycrystalline, monocrystalline, or amorphous transparent conductive material, such as indium tin oxide (ITO), indium zinc oxide (IZO), or the like. The common electrodes 270 disposed in the adjacent pixels are connected to each other.

The common electrode 270 is physically and electrically connected to the protrusion 133 of the common voltage line 131 through the common contact hole 186 formed in the passivation layer 180 and the gate insulating layer 140.

Although not illustrated, an alignment layer is coated on the common electrode 270 and the passivation layer 180, and the alignment layer may be a horizontal alignment layer and is rubbed in a predetermined direction.

The upper panel 200 includes a light blocking member 220. The light blocking member 220 is formed on a second insulation substrate 210 made of transparent glass or plastic. The light blocking member 220 is called a black matrix and blocks light from a backlight unit (not illustrated).

Further, a plurality of color filters 230 are formed on a second insulation substrate 210. Most of the plurality of color filters 230 exist in an area surrounded by the light blocking member 220 and may be elongated in a vertical direction along the pixel electrode 191. Each color filter 230 may have one of the primary colors such as three primary colors of red, green and blue.

An overcoat 250 is formed on the color filter 230 and the light blocking member 220. The overcoat 250 may be made of an (organic) insulator to prevent the color filter 230 from being exposed to a liquid crystal layer, and provide a flat surface. The overcoat 250 may be omitted.

A column spacer 325 is formed between the lower panel 100 and the upper panel 200.

The column spacer 325 may be formed at a position overlapping a thin film transistor including the gate electrode 124, the semiconductor 154, the source electrode 173, and the drain electrode 175.

The column spacer 325 may be formed for every two or more dots and every six or more pixels along a row direction and along a column direction . . . In detail, the column spacer 325 may be formed for every six or more pixels along a row direction and along a column direction.

The liquid crystal layer 3 includes a plurality of liquid crystal molecules, and the liquid crystal molecules are aligned so that long axial directions thereof are parallel to the panels 100 and 200.

The pixel electrode 191 receives a data voltage from the drain electrode 175. The common electrode 270 receives a common voltage having a predetermined voltage from the common voltage line 131. In this exemplary embodiment, the common electrodes 270 are connected to each other to receive the common voltage from a common voltage supplying unit disposed outside the display area, but receive common voltages having the same voltage from the common voltage line 131 in the display areas to prevent a voltage drop and the like.

The pixel electrode 191 to which the data voltage is applied generates an electric field together with the common electrode 270 receiving the common voltage. The liquid crystal molecules of the liquid crystal layer 3 disposed between the two electrodes 191 and 270 rotate in a direction parallel to the direction of the electric field. Polarization of light passing through the liquid crystal layer varies according to the predetermined rotation directions of the liquid crystal molecules.

Referring to FIG. 2B, the column spacer 325 is formed at a position overlapping the thin film transistor. However, in a process of forming the column spacer 325, the column spacer 325 may be formed at a position other than a desired position due to misalignment, and the position of the column spacer 325 may be shifted to an adjacent region by external pressure. Accordingly, a width of the light blocking member 220 overlapping the column spacer 325 may be formed to be larger than a width of the column spacer 325.

According to the liquid crystal display according to the exemplary embodiment of the present invention, the common contact hole 186 for a connection between the protrusion 133 of the common voltage line 131 and the common electrode 270 is formed to be adjacent to the column spacer 325, and as a result, the contact hole 186 may be covered by the light blocking member 220 which overlaps the column spacer 325. Accordingly, an additional light blocking member for covering the common contact hole 186 which connects the common voltage line 131 and the common electrode 270 may not be required, and the common contact hole 186 may be covered by the light blocking member 220. Therefore, without deteriorating the aperture ratio of the liquid crystal display, the common contact hole 186 for connecting the common voltage line 131 and the common electrode 270 may be formed.

Then, a layout of signal lines of the liquid crystal display according to the exemplary embodiment of the present invention will be described with reference to FIG. 3. FIG. 3 is a layout view illustrating some of signal lines of the liquid crystal display according to the exemplary embodiment of the present invention.

Referring to FIG. 3, the liquid crystal display according to the exemplary embodiment includes a first pixel row PX1, a second pixel row PX2, a third pixel row PX3, and a fourth pixel row PX4 which are disposed between two adjacent gate lines. Further, the liquid crystal display includes a first data line 171a, a second data line 171b, a third data line 171c, and a fourth data line 171d which are adjacent to each other.

In each of the pixel rows PX1, PX2, PX3, and PX4, the common voltage line 131 is formed.

The connection portion 132 and the protrusion 133 of the common voltage line 131 disposed in the first pixel row PX1 are formed at a position which partially overlaps the first data line 171a, the connection portion 132 and the protrusion 133 of the common voltage line 131 disposed in the second pixel row PX2 are formed at a position which partially overlaps the fourth data line 171d, the connection portion 132 and the protrusion 133 of the common voltage line 131 disposed in the third pixel row PX3 are formed at a position which partially overlaps the third data line 171c, and the connection portion 132 and the protrusion 133 of the common voltage line 131 disposed in the fourth pixel row PX4 are formed at a position which partially overlaps the second data line 171b.

As such, the connection portion 132 and the protrusion 133 of the common voltage line 131 disposed in the adjacent pixel rows are formed at a position partially overlapping different data lines. Accordingly, an overlapping area of each of the data lines 171a, 171b, 171c, and 171d and the common voltage line 131 may be evenly formed. Therefore, coupling between each of the data lines 171a, 171b, 171c, and 171d and the common voltage line 131 may substantially be uniform. When the connection portion 132 and the protrusion 133 of the common voltage line 131 are formed to overlap only a part of one data lines, a coupling formed between the common voltage line 131 and the data line which overlaps the connection portion 132 and the protrusion 133 of the common voltage line 131 and a coupling formed between the common voltage line 131 and the data line which does not overlap the connection portion 132 and the protrusion 133 of the common voltage line 131 may be different. The coupling difference causes deterioration in display quality such as vertical lines.

Although each pixel rows PX1, PX2, PX3, and PX4 include the connection portion 132 and the protrusion 133 of the common voltage line 131, the present invention is not limited thereto. That is, the connection portion 132 and the protrusion 133 of the common voltage line 131 may be formed every six or more pixels rows and every six or more pixels column.

The layout of the signal lines illustrated in FIG. 3 relates to the liquid crystal display according to the exemplary embodiment of the present invention, and according to a liquid crystal display according to another exemplary embodiment of the present invention, a layout of an overlapping portion of the data line and the common voltage line may be different from that of the FIG. 3. According to the exemplary embodiments of the invention, the overlapping portions of the data lines and the common voltage lines may be evenly distributed throughout the liquid crystal display.

Figure 4:
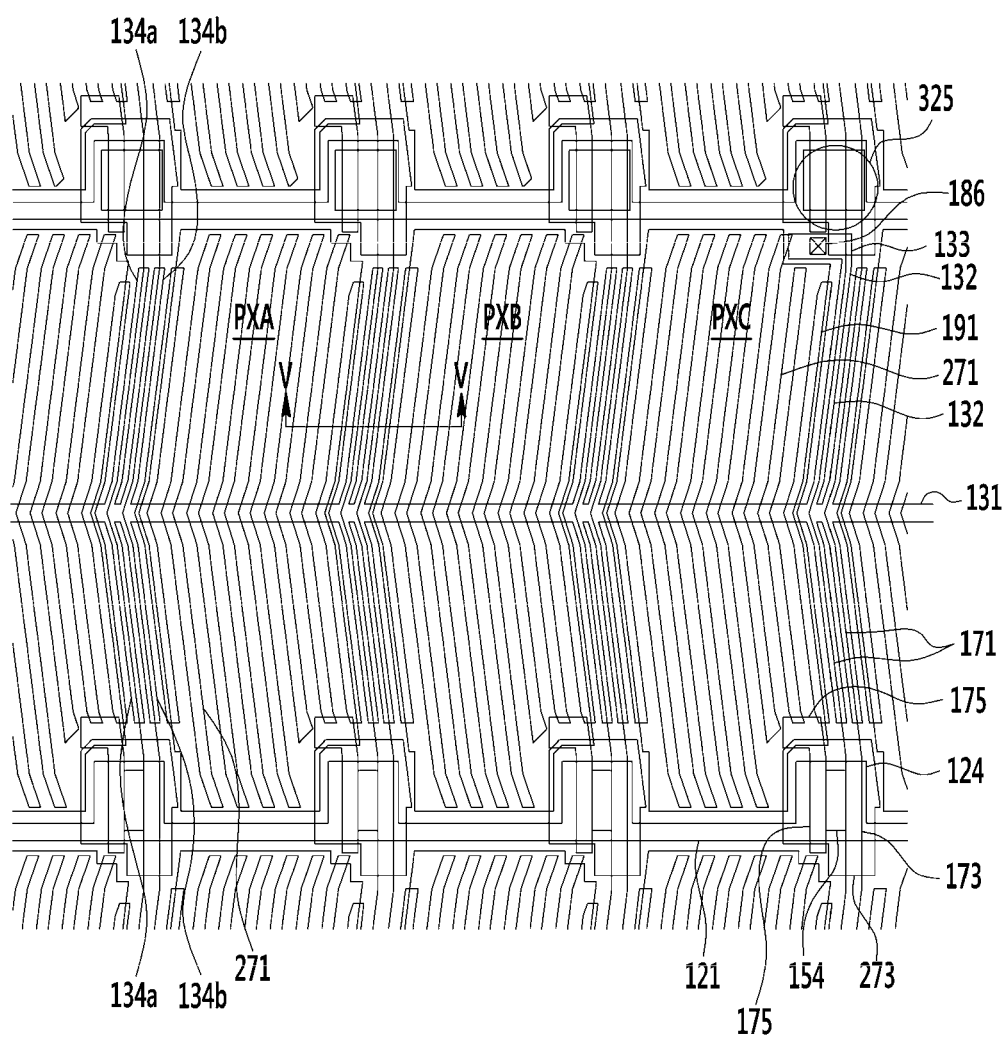
FIG. 4 is a layout view illustrating some pixels of a liquid crystal display according to another exemplary embodiment of the present invention.

A liquid crystal display according to another exemplary embodiment of the present invention will be described with reference to FIGS. 4 and 5. FIG. 4 is a layout view illustrating some pixels of a liquid crystal display according to another exemplary embodiment of the present invention, and FIG. 5 is a cross-sectional view of the liquid crystal display of FIG. 4 taken along line V-V.

Figure 5:
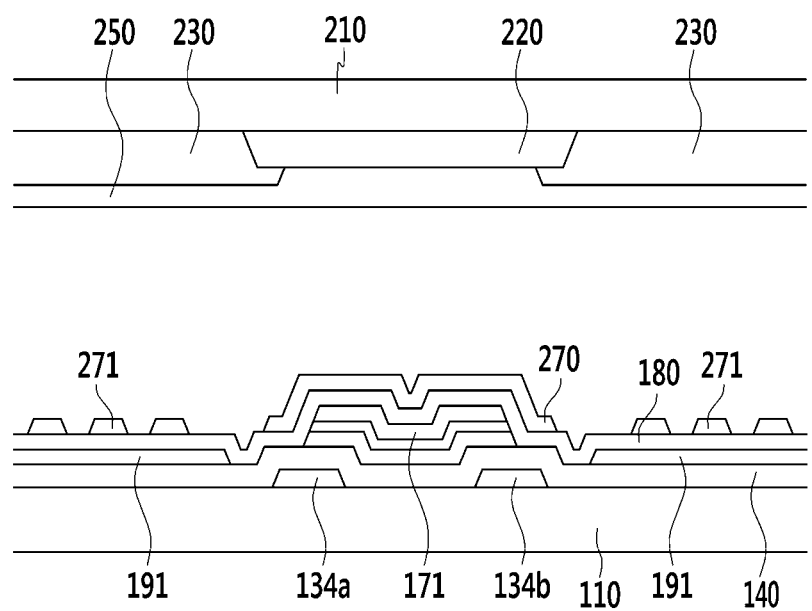
FIG. 5 is a cross-sectional view of the liquid crystal display of FIG. 4 taken along line V-V.

Referring to FIGS. 4 and 5, the liquid crystal display according to the exemplary embodiment is similar to the liquid crystal display according to the exemplary embodiment described with reference to FIGS. 1, 2A, and 2B. A detailed description for like constituent elements is omitted.

The liquid crystal display according to the exemplary embodiment of the present invention includes a plurality of pixels PXA, PAB, and PXC adjacent to each other.

The plurality of pixels PXA, PAB, and PXC includes a gate line 121, a common voltage line 131, a plurality of data lines 171, a pixel electrode 191, and a common electrode 270.

The common voltage line 131 has a protrusion 133, and the protrusion 133 of the common voltage line 131 overlaps a common contact hole 186 for connecting the common voltage line 131 with the common electrode 270. The contact hole 186 is formed to be adjacent to a column spacer 325.

By forming the contact hole 186 to be adjacent to the column spacer 325, the contact hole 186 may be covered by a light blocking member 220 overlapping the column spacer 325. Accordingly, an additional light blocking member for covering the common contact hole 186 which connects the common voltage line 131 and the common electrode 270 may not be required. Therefore, without deteriorating the aperture ratio of the liquid crystal display, the common contact hole 186 for connecting the common voltage line 131 and the common electrode 270 to each other may be formed.

The column spacer 325 serves to uniformly control a gap between two substrates facing each other, that is, a cell gap.

The protrusion 133 of the common voltage line 131, the common contact hole 186, and the column spacer 325 may be formed one by one for every two or more dots every six or more pixels along a row direction and along a column direction. In detail, the protrusion 133 of the common voltage line 131, the common contact hole 186, and the column spacer 325 may be formed one by one for every six or more pixels along a row direction and along a column direction.

As such, by forming one protrusion 133 of the common voltage line 131 for every two or more dots and every six or more pixels along a row direction and along a column direction, an aperture ratio of the liquid crystal display may be prevented from deteriorating due to the common contact hole 186 for connecting the common voltage line 131 and the common electrode 270 to each other.

The column spacer 325 is formed at a position overlapping the thin film transistor. However, in a process of forming the column spacer 325, the column spacer 325 may be formed at another adjacent position other than a desired position, and the position of the column spacer 325 may be changed into an adjacent region by external pressure. Accordingly, a width of the light blocking member overlapping the column spacer 325 is formed to be larger than a width of the column spacer 325.

According to the liquid crystal display according to the exemplary embodiment of the present invention, the common contact hole 186 for connection between the protrusion 133 of the common voltage line 131 and the common electrode 270 is formed to be adjacent to the column spacer 325, and as a result, the contact hole 186 may be covered by the light blocking member overlapping the column spacer 325. Accordingly, even though an additional light blocking member for covering the common contact hole 186 which connects the common voltage line 131 and the common electrode 270 to each other is not formed, the common contact hole 186 may be covered by the light blocking member 220. Therefore, without deteriorating the aperture ratio of the liquid crystal display, the common contact hole 186 for connecting the common voltage line 131 and the common electrode 270 to each other may be formed.

Referring to FIGS. 4 and 5, unlike the liquid crystal display according to the exemplary embodiment described with reference to FIGS. 1, 2A, and 2B, the liquid crystal display according to the exemplary embodiment may further include a first extension 134a and a second extension 134b extended from the common voltage line 131.

The first extension 134a of the common voltage line 131 is disposed at a left side of the data line 171, and the second extension 134b is disposed at a right side of the data line 171. As such, when the first extension 134a and the second extension 134b of the common voltage line 131 overlapping the data line 171 are formed at both sides of the data line 171, coupling between the first extension 134a and the second extension 134b of the common voltage line 131 overlapping the data line 171 and the data line 171 may be formed. Thus, the coupling formed between the common electrode 270 and the data line 171 may be reduced.

Accordingly, unnecessary coupling between the data line 171 and the common electrode 270 is reduced to thereby prevent deterioration of display quality due to the unnecessary coupling between the data line 171 and the common electrode 270.

Further, by forming the first extension 134a and the second extension 134b of the common voltage line 131 at both sides of the data line 171, a width of the light blocking member overlapping the data line 171 may be reduced while preventing light leakage which may be generated at a portion adjacent to the data line 171.

Hereinabove, many features of the liquid crystal display according to the exemplary embodiment described with reference to FIGS. 1. 2A, 2B, and 3 may all be applied to the liquid crystal display according to the exemplary embodiment.

Figure 6:
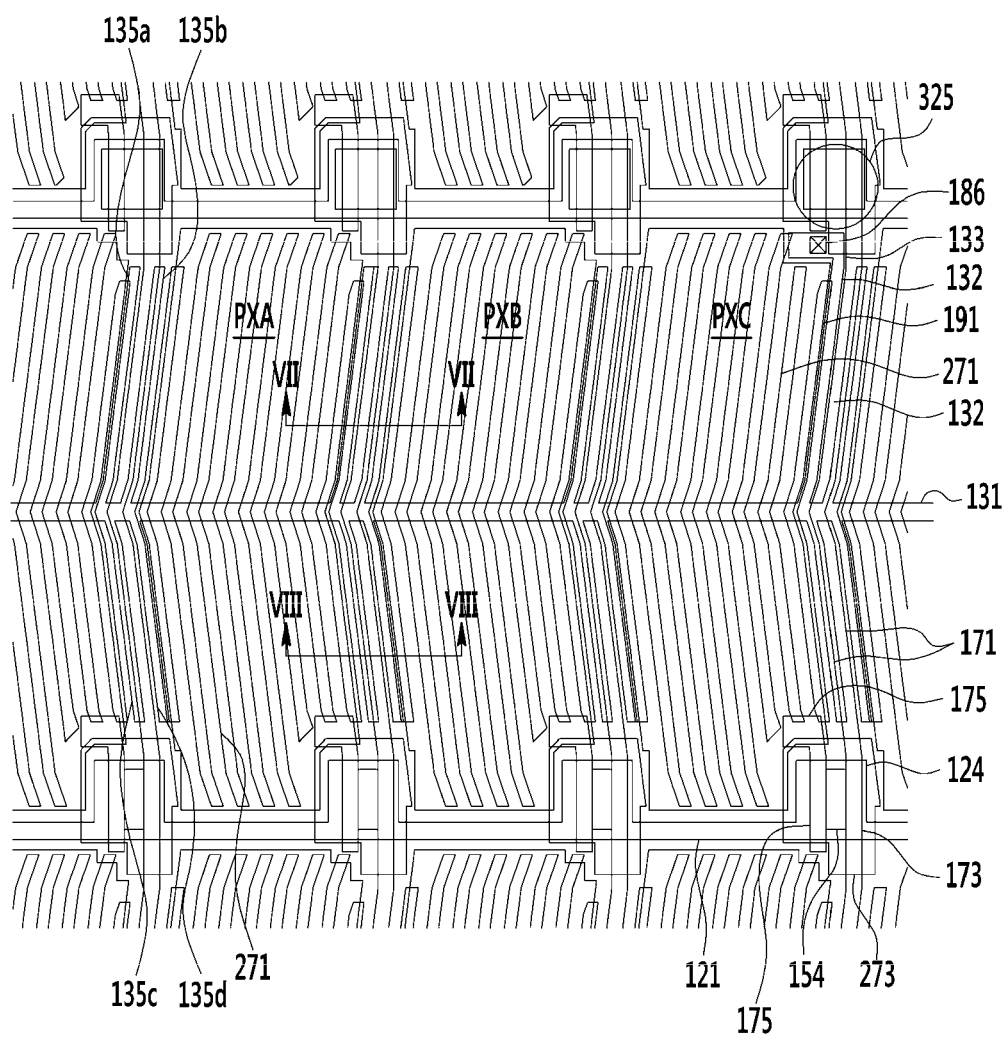
FIG. 6 is a layout view illustrating some pixels of a liquid crystal display according to another exemplary embodiment of the present invention.

A liquid crystal display according to another exemplary embodiment of the present invention will be described with reference to FIGS. 6 to 8. FIG. 6 is a layout view illustrating some pixels of a liquid crystal display according to another exemplary embodiment of the present invention, FIG. 7 is a cross-sectional view of the liquid crystal display of FIG. 6 taken along line VII-VII, and FIG. 8 is a cross-sectional view of the liquid crystal display of FIG. 6 taken along line VIII-VIII.

Figure 7:
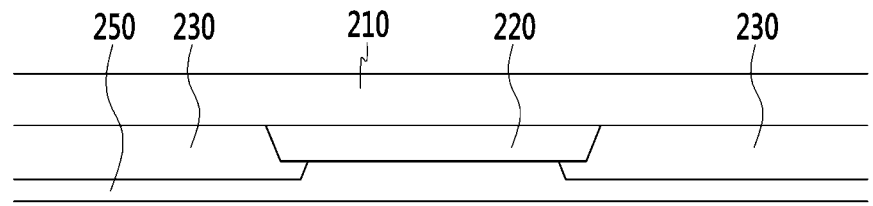
FIG. 7 is a cross-sectional view of the liquid crystal display of FIG. 6 taken along line VII-VII.
Figure 7:
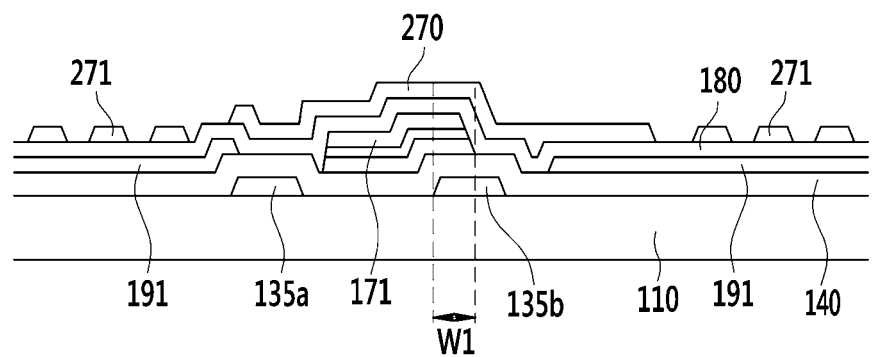
Figure 8:
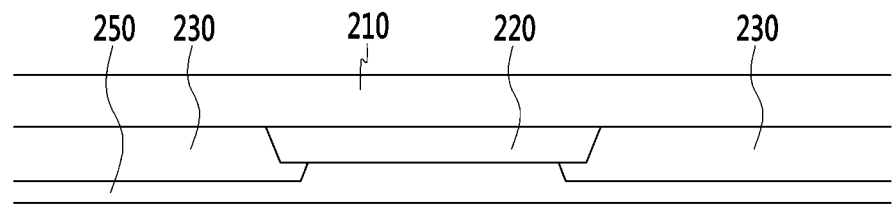
FIG. 8 is a cross-sectional view of the liquid crystal display of FIG. 6 taken along line VIII-VIII.
Figure 8:
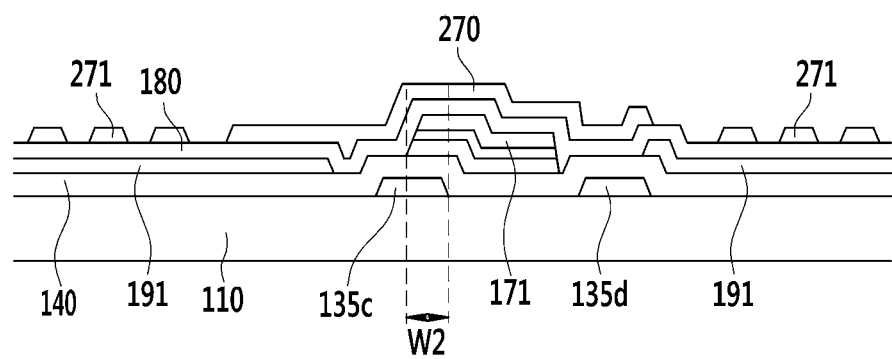

Referring to FIGS. 6 to 8, the liquid crystal display according to the exemplary embodiment is similar to the liquid crystal display according to the exemplary embodiment described with reference to FIGS. 1, 2A, and 2B. A detailed description for like constituent elements is omitted.

The liquid crystal display according to the exemplary embodiment of the present invention includes a plurality of pixels PXA, PAB, and PXC adjacent to each other.

The plurality of pixels PXA, PAB, and PXC includes a gate line 121, a common voltage line 131, a plurality of data lines 171, a pixel electrode 191, and a common electrode 270.

The common voltage line 131 has a protrusion 133, and the protrusion 133 of the common voltage line 131 overlaps a common contact hole 186 for connecting the common voltage line 131 with the common electrode 270. The contact hole 186 is formed to be adjacent to a column spacer 325.

By forming the contact hole 186 to be adjacent to the column spacer 325, the contact hole 186 may be covered by using a light blocking member 220 overlapping the column spacer 325. Accordingly, an additional light blocking member for covering the common contact hole 186 which connects the common voltage line 131 and the common electrode 270 may not be required. Therefore, without deteriorating the aperture ratio of the liquid crystal display, the common contact hole 186 for connecting the common voltage line 131 and the common electrode 270 may be formed.

The column spacer 325 serves to uniformly control a gap between two substrates facing each other, that is, a cell gap.

The protrusion 133 of the common voltage line 131, the common contact hole 186, and the column spacer 325 may be formed for every two or more dots and every six or more pixels along a row direction and along a column direction. In detail, the protrusion 133 of the common voltage line 131, the common contact hole 186, and the column spacer 325 may be formed for every six or more pixels along a row direction and along a column direction.

As such, by forming one protrusion 133 of the common voltage line 131 for every two or more dots and every six or more pixels along a row direction and along a column direction, an aperture ratio of the liquid crystal display may be prevented from deteriorating due to the common contact hole 186 for connecting the common voltage line 131 and the common electrode 270.

The column spacer 325 is formed at a position overlapping the thin film transistor. However, in a process of forming the column spacer 325, the column spacer 325 may be formed at another position other than a desired position due to misalignment, and the position of the column spacer 325 may be shifted to an adjacent region by external pressure. Accordingly, a width of the light blocking member overlapping the column spacer 325 is formed to be larger than a width of the column spacer 325.

According to the liquid crystal display according to the exemplary embodiment of the present invention, the common contact hole 186 for connection between the protrusion 133 of the common voltage line 131 and the common electrode 270 is formed to be adjacent to the column spacer 325, and as a result, the contact hole 186 may be covered by the light blocking member overlapping the column spacer 325. Accordingly, even though an additional light blocking member for covering the common contact hole 186 which connects the common voltage line 131 and the common electrode 270 is not formed, the common contact hole 186 may be covered by the light blocking member 220. Therefore, without deteriorating the aperture ratio of the liquid crystal display, the common contact hole 186 for connecting the common voltage line 131 and the common electrode 270 may be formed.

Referring to FIGS. 6 to 8, unlike the liquid crystal display according to the exemplary embodiment described with reference to FIGS. 1, 2A, and 2B, the liquid crystal display according to the exemplary embodiment further includes a third extension 135a and a fourth extension 135b, and a fifth extension 135c and a sixth extension 135d extended from the common voltage line 131.

The third extension 135a of the common voltage line 131 is disposed at a left side of the data line 171, the fourth extension 135b is disposed at a right side of the data line 171, and the third extension 135a and the fourth extension 135b extend upward along the data line 171 from the common voltage line 131. The fifth extension 135c of the common voltage line 131 is disposed at a left side of the data line 171, and the sixth extension 135d is disposed at a right side of the data line 171 and extends downward along the data line 171.

The third extension 135a of the common voltage line 131 and the fifth extension 135c of the common voltage line 131 are not disposed in a line, and the fourth extension 135b of the common voltage line 131 and the sixth extension 135d of the common voltage line 131 are not disposed in a line. In more detail, the third extension 135a and the fourth extension 135b are disposed to be shifted toward the left, and the fifth extension 135c and the sixth extension 135d are disposed to be shifted toward the right. However, according to a liquid crystal display according to another exemplary embodiment of the present invention, the third extension 135a and the fourth extension 135b may be disposed to be shifted toward the right, and the fifth extension 135c and the sixth extension 135d may be disposed to be shifted toward the left.

The third extension 135a is spaced apart from the data line 171, and the fourth extension 135b partially overlapping the data line 171 at the right side of the data line 171. The fifth extension 135c partially overlapping the data line 171 at the left side of the data line 171, and the sixth extension 135d is spaced apart from the data line 171. In this case, a first width W1 of an overlapping portion of the fourth extension 135b and the data line 171 may substantially be the same as a second width W2 of an overlapping portion of the fifth extension 135c and the data line 171.

According to a liquid crystal display according to another exemplary embodiment of the present invention, the third extension 135a may partially overlapping the data line 171 at the left side of the data line 171, and the sixth extension 135d may partially overlapping the data line 171 at the right side of the data line 171. In this case, a width of the overlapping portion of the third extension 135a and the data line 171 may substantially be the same as a width of the overlapping portion of the sixth extension 135d and the data line 171.

As such, the positions of the third extension 135a and the fourth extension 135b, and the positions of the fifth extension 135c and the sixth extension 135d, which extend from the common voltage line 131, are different from each other, and as a result, when the third to sixth extensions 135a, 135b, 135c, and 135d of the common voltage line 131 and the data line 171 are formed, even in the case where horizontal misalignment occurs, an overlapping area between the third to sixth extensions 135a, 135b, 135c, and 135d extending from the common voltage line 131 and the data line 171 may be uniformly maintained.

In more detail, when the data line 171 moves to a left side of the third to sixth extensions 135a, 135b, 135c, and 135d of the common voltage line 131, an overlapping area between the third extension 135a and the fifth extension 135c of the common voltage line 131 becomes larger, but an overlapping area between the fourth extension 135b and the sixth extension 135d of the common voltage line 131 may become smaller. Further, even though the data line 171 further moves to the left side of the third to sixth extensions 135a, 135b, 135c, and 135d of the common voltage line 131, and the data line 171 does not overlap the fifth extension 135c, the data line 171 may still overlap the third extension 135a.

Similarly, when the data line 171 moves to a right side of the third to sixth extensions 135a, 135b, 135c, and 135d of the common voltage line 131, an overlapping area between the fourth extension 135b and the sixth extension 135d of the common voltage line 131 becomes larger, but an overlapping area between the third extension 135a and the fifth extension 135c of the common voltage line 131 may become smaller. Further, even though the data line 171 further moves to the right side of the third to sixth extensions 135a, 135b, 135c, and 135d of the common voltage line 131, and the data line 171 does not overlap the fourth extension 135b, the data line 171 may still overlap the sixth extension 135d.

When the third to sixth extensions 135a, 135b, 135c, and 135d of the common voltage line 131 are formed at both sides of the data line 171, coupling between the third to sixth extensions 135a, 135b, 135c, and 135d of the common voltage line 131 and the data line 171 overlapping the data line 171 may be formed. Thus the coupling formed between the common electrode 270 and the data line 171 may be reduced. Accordingly, unnecessary coupling between the data line 171 and the common electrode 270 is reduced to thereby prevent deterioration of display quality due to the unnecessary coupling between the data line 171 and the common electrode 270.

The positions of the third extension 135a and the fourth extension 135b, and the positions of the fifth extension 135c and the sixth extension 135d, which extend from the common voltage line 131, are different from each other, and as a result, when the third to sixth extensions 135a, 135b, 135c, and 135d of the common voltage line 131 and the data line 171 are misaligned, an overlapping area between the third to sixth extensions 135a, 135b, 135c, and 135d and the data line 171 may be uniformly maintained. Therefore, it is possible to prevent deterioration in the display quality such as a vertical line due to the coupling difference between the common voltage line 131 and the data line 171.

Further, by forming the third extension 135a, the fourth extension 135b, the fifth extension 135c and the fourth extension 135d of the common voltage line 131 at both sides of the data line 171, and by forming the third extension 135a and the fourth extension 135b shift toward a left and the fifth extension 135c and the sixth extension 135d shift toward a right, a width of the light blocking member overlapping the data line 171 may be formed to be small while preventing light leakage which may be generated at a portion adjacent to the data line 171.

Hereinabove, many features of the liquid crystal display according to the exemplary embodiment described with reference to FIGS. 1, 2A, 2B, and 3 may all be applied to the liquid crystal display according to the exemplary embodiment.

Figure 9:
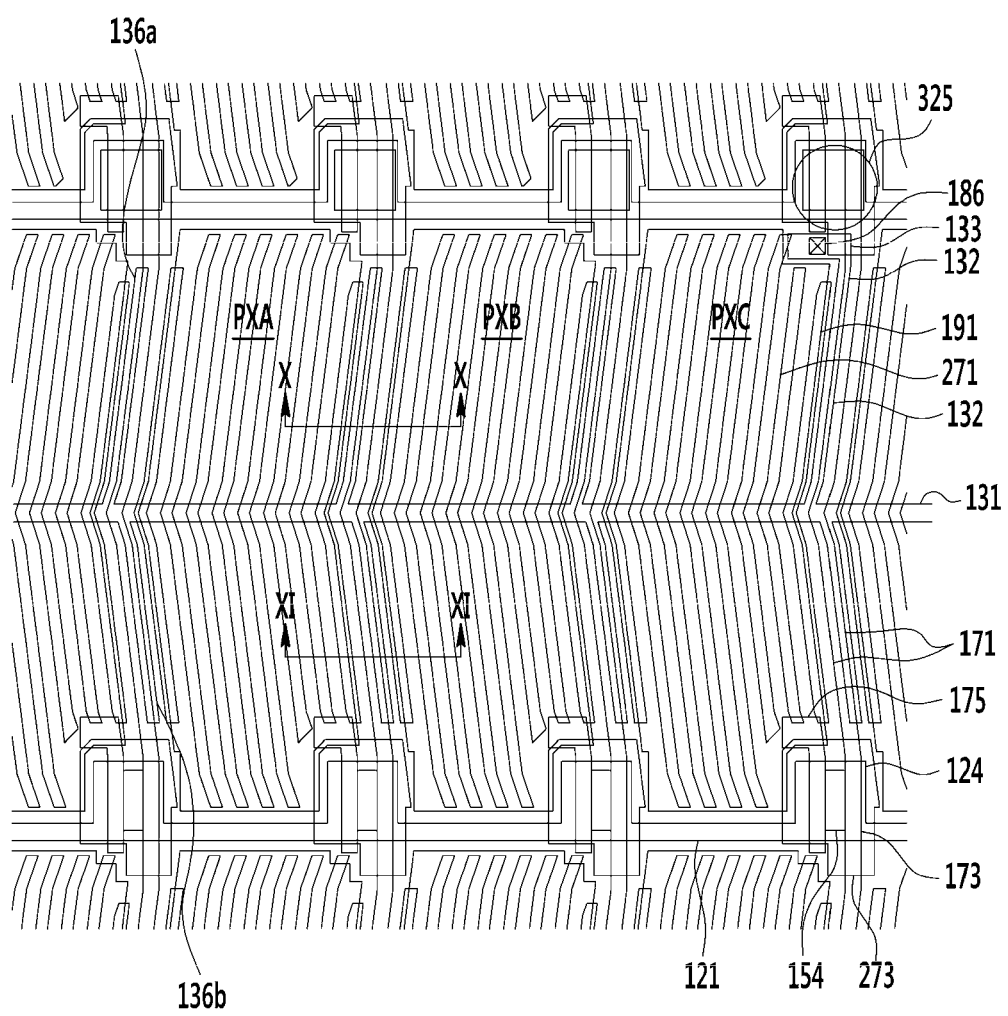
FIG. 9 is a layout view illustrating some pixels of a liquid crystal display according to another exemplary embodiment of the present invention.

A liquid crystal display according to another exemplary embodiment of the present invention will be described with reference to FIGS. 9 to 11. FIG. 9 is a layout view illustrating some pixels of a liquid crystal display according to another exemplary embodiment of the present invention, FIG. 10 is a cross-sectional view of the liquid crystal display of FIG. 9 taken along line X-X, and FIG. 11 is a cross-sectional view of the liquid crystal display of FIG. 9 taken along line XI-XI.

Figure 10:
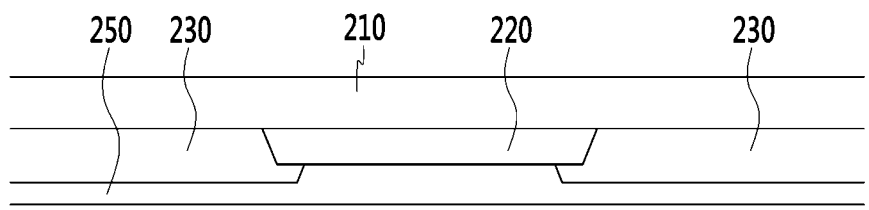
FIG. 10 is a cross-sectional view of the liquid crystal display of FIG. 9 taken along line X-X.
Figure 10:
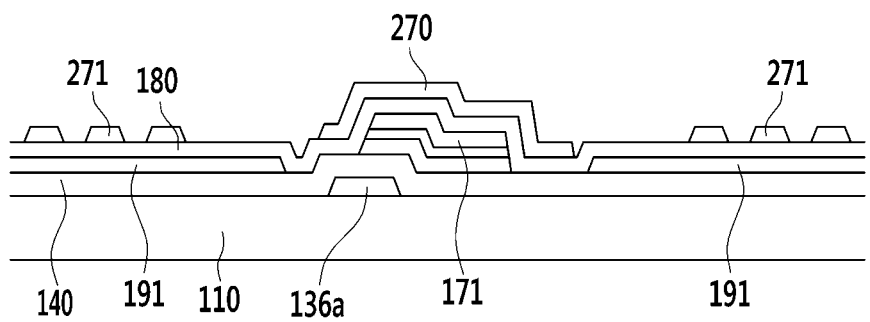
Figure 11:
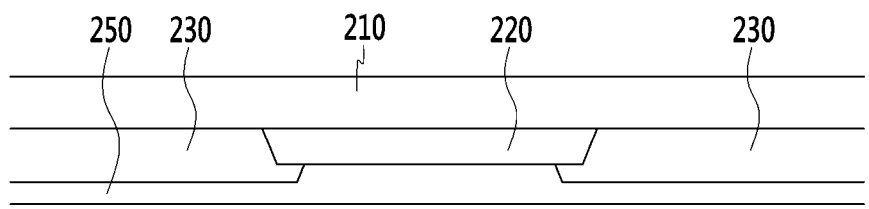
FIG. 11 is a cross-sectional view of the liquid crystal display of FIG. 9 taken along line XI-XI.
Figure 11:
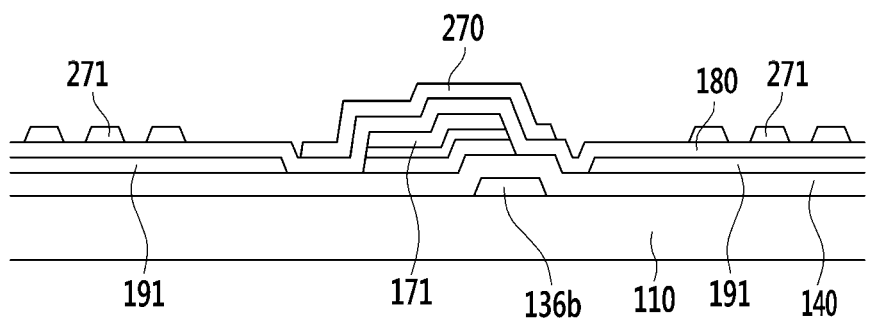

Referring to FIGS. 9 to 11, the liquid crystal display according to the exemplary embodiment is similar to the liquid crystal display according to the exemplary embodiment described with reference to FIGS. 1, 2A, and 2B. A detailed description for like constituent elements is omitted.

The liquid crystal display according to the exemplary embodiment of the present invention includes a plurality of pixels PXA, PAB, and PXC adjacent to each other.

The plurality of pixels PXA, PAB, and PXC includes a gate line 121, a common voltage line 131, a plurality of data lines 171, a pixel electrode 191, and a common electrode 270.

The common voltage line 131 has a protrusion 133, and the protrusion 133 of the common voltage line 131 overlaps a common contact hole 186 for connecting the common voltage line 131 with the common electrode 270. The contact hole 186 is formed to be adjacent to a column spacer 325.

By forming the contact hole 186 to be adjacent to the column spacer 325, the contact hole 186 may be covered by a light blocking member 220 overlapping the column spacer 325. Accordingly, an additional light blocking member for covering the common contact hole 186 for connecting the common voltage line 131 and the common electrode 270 may not be required. Therefore, without deteriorating the aperture ratio of the liquid crystal display, the common contact hole 186 for connecting the common voltage line 131 and the common electrode 270 may be formed.

The column spacer 325 serves to uniformly control a gap between two substrates facing each other, that is, a cell gap.

The protrusion 133 of the common voltage line 131, the common contact hole 186, and the column spacer 325 may be formed for every two or more dots and every six or more pixels along a row direction and along a column direction. In detail, the protrusion 133 of the common voltage line 131, the common contact hole 186, and the column spacer 325 may be formed for every six or more pixels along a row direction and along a column direction.

As such, by forming one protrusion 133 of the common voltage line 131 for every two or more dots and every six or more pixels along a row direction and along a column direction, an aperture ratio of the liquid crystal display may be prevented from deteriorating due to the common contact hole 186 for connecting the common voltage line 131 and the common electrode 270 to each other.

The column spacer 325 is formed at a position overlapping the thin film transistor. However, in a process of forming the column spacer 325, the column spacer 325 may be formed at another adjacent position other than a desired position due to a misalignment, and the position of the column spacer 325 may be shifted into an adjacent region by external pressure. Accordingly, a width of the light blocking member overlapping the column spacer 325 is formed to be larger than a width of the column spacer 325.

According to the liquid crystal display according to the exemplary embodiment of the present invention, the common contact hole 186 for connection between the protrusion 133 of the common voltage line 131 and the common electrode 270 is formed to be adjacent to the column spacer 325, and as a result, the contact hole 186 may be covered by using the light blocking member overlapping the column spacer 325. Accordingly, even though an additional light blocking member for covering the common contact hole 186 which connects the common voltage line 131 and the common electrode 270 is not formed, the common contact hole 186 may be covered by the light blocking member 220. Therefore, without deteriorating the aperture ratio of the liquid crystal display, the common contact hole 186 for connecting the common voltage line 131 and the common electrode 270 may be formed.

Referring to FIGS. 9 to 11, unlike the liquid crystal display according to the exemplary embodiment described with reference to FIGS. 1, 2A, and 2B, the liquid crystal display according to the exemplary embodiment further includes a seventh extension 136a and an eighth extension 136b extending from the common voltage line 131.

The seventh extension 136a of the common voltage line 131 is disposed at a left side of the data line 171 and extends upward along the data line 171, and the eighth extension 136b is disposed at a right side of the data line 171 and extends downward along the data line 171. However, according to a liquid crystal display according to another exemplary embodiment of the present invention, the seventh extension 136a may be disposed at the right side of the data line 171 and extends downward along the data line 171, and the eighth extension 136b may be disposed at the left side of the data line 171 and extends upward along the data line 171.

As such, when the seventh extension 136a and the eighth extension 136b of the common voltage line 131 overlapping the data line 171 are formed at both sides of the data line 171, coupling between the seventh extension 136a and the eighth extension 136b of the common voltage line 131 and the data line 171 is formed, and the coupling formed between the common electrode 270 and the data line 171 may be reduced. Accordingly, an effect of unnecessary coupling between the data line 171 and the common electrode 270 is reduced to thereby prevent deterioration in the display quality due to the unnecessary coupling between the data line 171 and the common electrode 270.

Further, by forming the seventh extension 136a and the eighth extension 136b of the common voltage line 131 which at least partially overlapping the data line 171, while a width of the light blocking member overlapping the data line 171 is formed to be small, light leakage which may be generated at a portion adjacent to the data line 171 may be prevented.

Hereinabove, many features of the liquid crystal display according to the exemplary embodiment described with reference to FIGS. 1, 2A, 2B, and 3 may all be applied to the liquid crystal display according to the exemplary embodiment.

Figure 12:
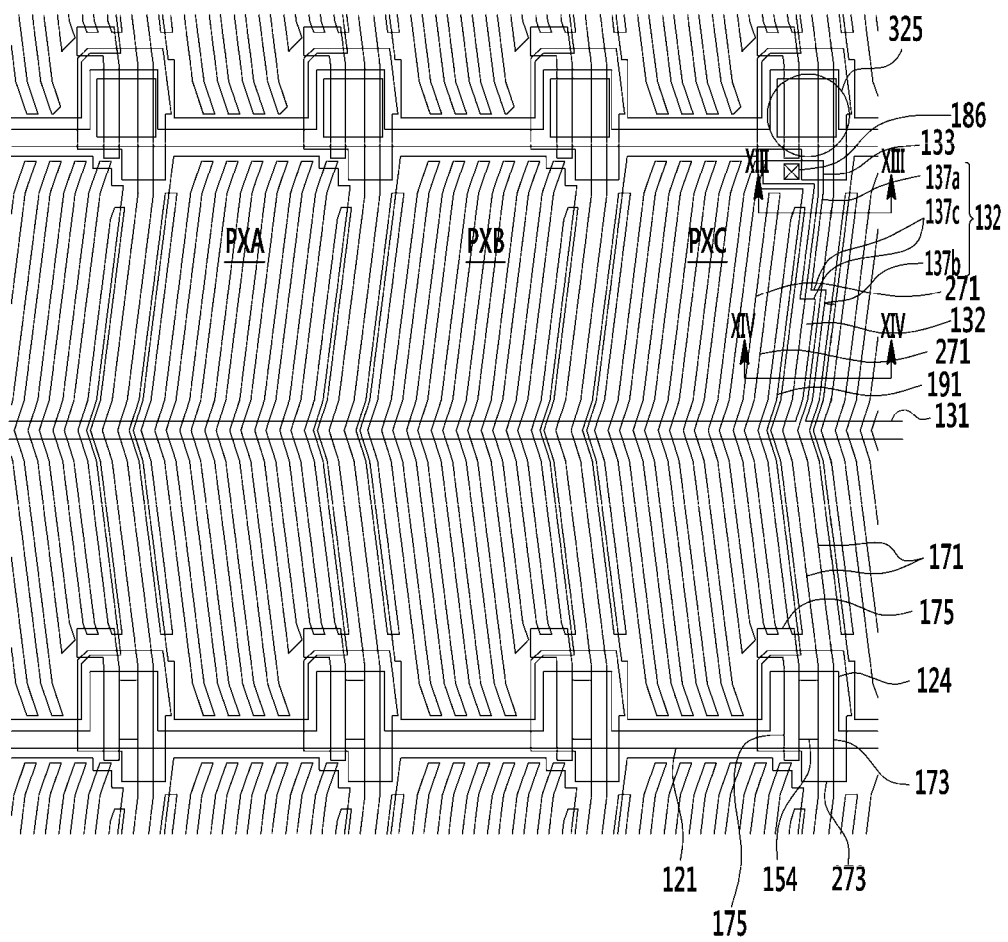
FIG. 12 is a layout view illustrating some pixels of a liquid crystal display according to another exemplary embodiment of the present invention.

A liquid crystal display according to another exemplary embodiment of the present invention will be described with reference to FIGS. 12 to 14. FIG. 12 is a layout view illustrating some pixels of a liquid crystal display according to another exemplary embodiment of the present invention, FIG. 13 is a cross-sectional view of the liquid crystal display of FIG. 12 taken along line XIII-XIII, and FIG. 14 is a cross-sectional view of the liquid crystal display of FIG. 12 taken along line XIV-XIV.

Figure 13:
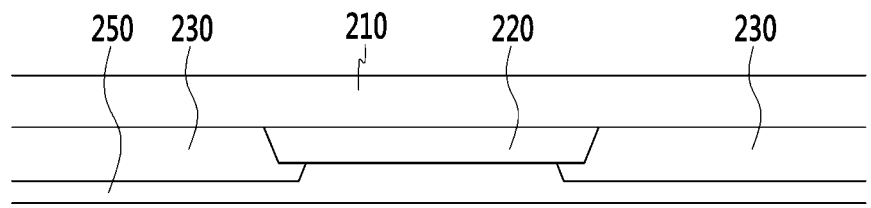
FIG. 13 is a cross-sectional view of the liquid crystal display of FIG. 12 taken along line XIII-XIII.
Figure 13:
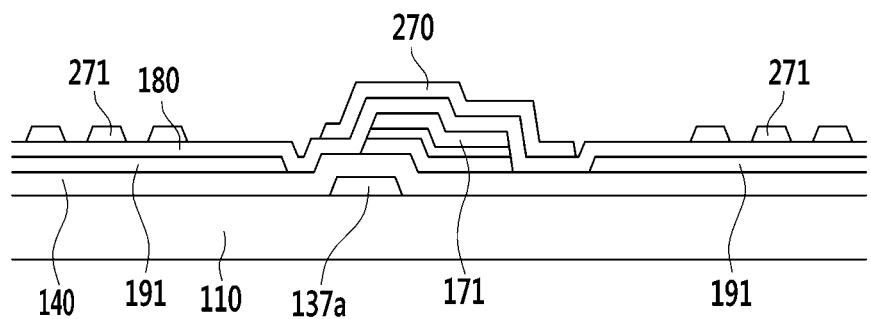
Figure 14:
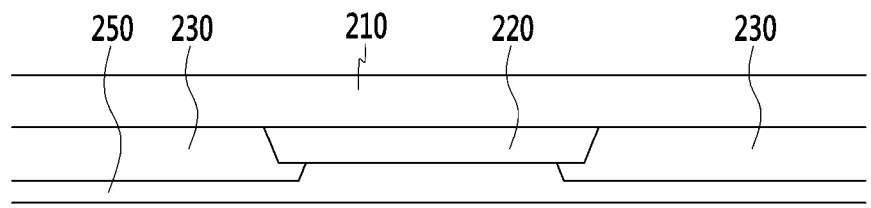
FIG. 14 is a cross-sectional view of the liquid crystal display of FIG. 12 taken along line XIV-XIV.
Figure 14:
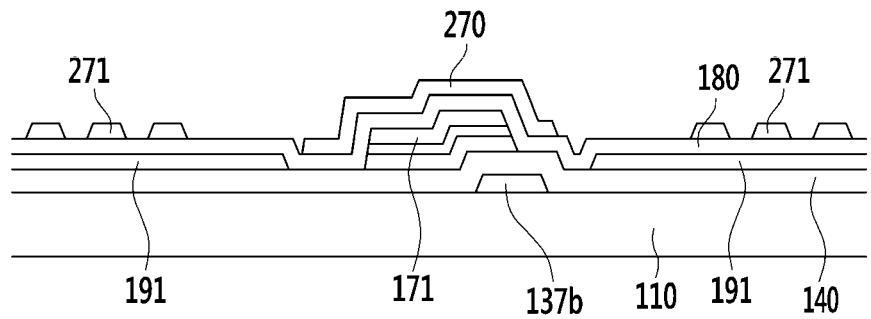

Referring to FIGS. 12 to 14, the liquid crystal display according to the exemplary embodiment is similar to the liquid crystal display according to the exemplary embodiment described with reference to FIGS. 1, 2A, and 2B. A detailed description for like constituent elements is omitted.

The liquid crystal display according to the exemplary embodiment of the present invention includes a plurality of pixels PXA, PAB, and PXC adjacent to each other.

The plurality of pixels PXA, PAB, and PXC includes a gate line 121, a common voltage line 131, a plurality of data lines 171, a pixel electrode 191, and a common electrode 270.

The common voltage line 131 has a protrusion 133, and the protrusion 133 of the common voltage line 131 overlaps a common contact hole 186 for connecting the common voltage line 131 with the common electrode 270. The contact hole 186 is formed to be adjacent to a column spacer 325.

By forming the contact hole 186 to be adjacent to the column spacer 325, the contact hole 186 may be covered by using a light blocking member 220 overlapping the column spacer 325. Accordingly, an additional light blocking member for covering the common contact hole 186 which connects the common voltage line 131 and the common electrode 270 may not be required. Therefore, without deteriorating the aperture ratio of the liquid crystal display, the common contact hole 186 for connecting the common voltage line 131 and the common electrode 270 may be formed.

The column spacer 325 serves to uniformly control a gap between two substrates facing each other, that is, a cell gap.

The protrusion 133 of the common voltage line 131, the common contact hole 186, and the column spacer 325 may be formed for every two or more dots and every six or more pixels along a row direction and along a column direction. In detail, the protrusion 133 of the common voltage line 131, the common contact hole 186, and the column spacer 325 may be formed for every six or more pixels along a row direction and along a column direction.

As such, by forming one protrusion 133 of the common voltage line 131 for every two or more dots and every six or more pixels along a row direction and along a column direction, an aperture ratio of the liquid crystal display may be prevented from deteriorating due to the common contact hole 186 for connecting the common voltage line 131 and the common electrode 270 to each other.

The column spacer 325 is formed at a position overlapping the thin film transistor. However, in a process of forming the column spacer 325, the column spacer 325 may be formed at another adjacent position other than a desired position due to misalignment, and the position of the column spacer 325 may be shifted to an adjacent region by external pressure. Accordingly, a width of the light blocking member overlapping the column spacer 325 is formed to be larger than a width of the column spacer 325.

According to the liquid crystal display according to the exemplary embodiment of the present invention, the common contact hole 186 for connection between the protrusion 133 of the common voltage line 131 and the common electrode 270 is formed to be adjacent to the column spacer 325, and as a result, the contact hole 186 may be covered by the light blocking member overlapping the column spacer 325. Accordingly, even though an additional light blocking member for covering the common contact hole 186 which connects the common voltage line 131 and the common electrode 270 is not formed, the common contact hole 186 may be covered by the light blocking member 220. Therefore, without deteriorating the aperture ratio of the liquid crystal display, the common contact hole 186 for connecting the common voltage line 131 and the common electrode 270 may be formed.

Referring to FIGS. 12 to 14, unlike the liquid crystal display according to the exemplary embodiment described with reference to FIGS. 1, 2A, and 2B, in the liquid crystal display according to the exemplary embodiment, a connection portion 132 connecting the common voltage line 131 and the protrusion 133 includes a first vertical portion 137*a* disposed at a left side of the data line 171, a second vertical portion 137*b* disposed at a right side of the data line 171, and a horizontal portion 137*c* connecting the first vertical portion 137*a* and the second vertical portion 137*b*. The second vertical portion 137*b* extends from the common voltage line 131, the horizontal portion 137*c* extends from the second vertical portion 137*b* substantially parallel to the gate line 121, and the first vertical portion 137*a* extends from the horizontal portion 137*c*, and then the protrusion 133 is formed at the end portion of the first vertical portion 137*a*.

As such, by forming the connection portion 132 of the common voltage line 131 which includes the first vertical portion 137*a* disposed at the left side of the data line 171, the second vertical portion 137*b* disposed at the right side of the data line 171, and the horizontal portion 137*c* connecting the first vertical portion 137*a* and the second vertical portion 137*b*, when the connection portion 132 of the common voltage line 131 and the data line 171 are formed, even in the case where horizontal misalignment occurs, an overlapping area between the connection portion 132 of the common voltage line 131 and the data line 171 may be uniformly maintained.

Hereinabove, many features of the liquid crystal display according to the exemplary embodiment described with reference to FIGS. 1, 2A, 2B, and 3 may all be applied to the liquid crystal display according to the exemplary embodiment.

Figure 15:
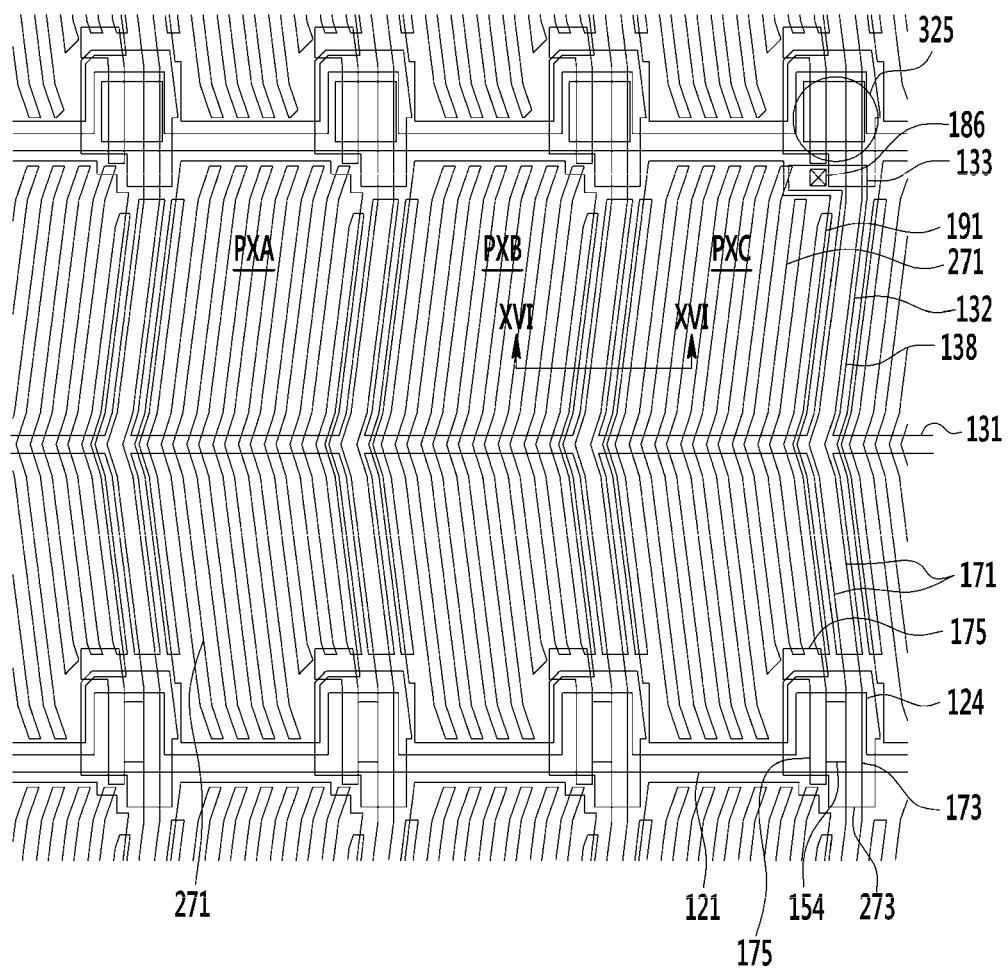
FIG. 15 is a layout view illustrating some pixels of a liquid crystal display according to another exemplary embodiment of the present invention.

Then, a liquid crystal display according to another exemplary embodiment of the present invention will be described with reference to FIGS. 15 and 16. FIG. 15 is a layout view illustrating some pixels of a liquid crystal display according to another exemplary embodiment of the present invention, and FIG. 16 is a cross-sectional view of the liquid crystal display of FIG. 15 taken along line XVI-XVI.

Figure 16:
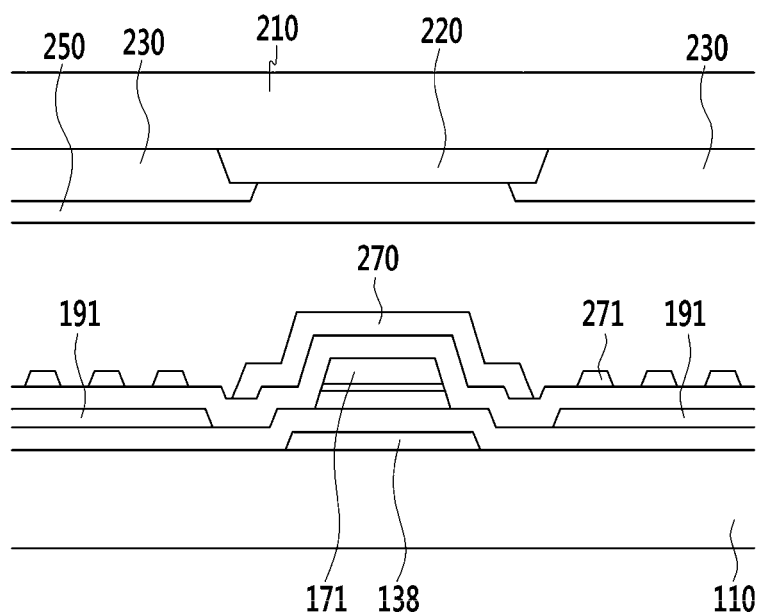
FIG. 16 is a cross-sectional view of the liquid crystal display of FIG. 15 taken along line XVI-XVI.

Referring to FIGS. 15 and 16, the liquid crystal display according to the exemplary embodiment is similar to the liquid crystal display according to the exemplary embodiment described with reference to FIGS. 1, 2A, and 2B. A detailed description for like constituent elements is omitted.

The liquid crystal display according to the exemplary embodiment of the present invention includes a plurality of pixels PXA, PAB, and PXC adjacent to each other.

The plurality of pixels PXA, PAB, and PXC includes a gate line 121, a common voltage line 131, a plurality of data lines 171, a pixel electrode 191, and a common electrode 270.

The common voltage line 131 has a protrusion 133, and the protrusion 133 of the common voltage line 131 is overlapped with a common contact hole 186 for connecting the common voltage line 131 with the common electrode 270. The contact hole 186 is formed to be adjacent to a column spacer 325.

By forming the contact hole 186 to be adjacent to the column spacer 325, the contact hole 186 may be covered by using a light blocking member 220 overlapping the column spacer 325. Accordingly, an additional light blocking member for covering the common contact hole 186 which connects the common voltage line 131 and the common electrode 270 may not be required. Therefore, without deteriorating the aperture ratio of the liquid crystal display, the common contact hole 186 for connecting the common voltage line 131 and the common electrode 270 to each other may be formed.

The column spacer 325 serves to uniformly control a gap between two substrates facing each other, that is, a cell gap.

The protrusion 133 of the common voltage line 131, the common contact hole 186, and the column spacer 325 may be formed one by one for every two or more dots and every six or more pixels along a row direction and along a column direction. In detail, the protrusion 133 of the common voltage line 131, the common contact hole 186, and the column spacer 325 may be formed one by one for every six or more pixels along a row direction and along a column direction.

As such, by forming one protrusion 133 of the common voltage line 131 for every two or more dots along a row direction and along a column direction, an aperture ratio of the liquid crystal display may be prevented from deteriorating due to the common contact hole 186 for connecting the common voltage line 131 and the common electrode 270 to each other.

The column spacer 325 is formed at a position overlapping with the thin film transistor. However, in a process of forming the column spacer 325, the column spacer 325 may be formed at another adjacent position other than a desired position due to misalignment, and the position of the column spacer 325 may be shifted to an adjacent region by external pressure. Accordingly, a width of the light blocking member overlapping the column spacer 325 is formed to be larger than a width of the column spacer 325. According to the liquid crystal display of the exemplary embodiment of the present invention, the common contact hole 186 for connection between the protrusion 133 of the common voltage line 131 and the common electrode 270 is formed to be adjacent to the column spacer 325, and as a result, the contact hole 186 may be covered by using the light blocking member overlapping the column spacer 325. Accordingly, even though an additional light blocking member for covering the common contact hole 186 which connects the common voltage line 131 and the common electrode 270 to each other is not formed, the common contact hole 186 may be covered by the light blocking member 220. Therefore, without deteriorating the aperture ratio of the liquid crystal display, the common contact hole 186 for connecting the common voltage line 131 and the common electrode 270 to each other may be formed.

Referring to FIGS. 15 and 16, unlike the liquid crystal display according to the exemplary embodiment described with reference to FIGS. 1, 2A, and 2B, the liquid crystal display according to the exemplary embodiment further includes a ninth extension 138 extends from the common voltage line 131.

The ninth extension 138 of the common voltage line 131 extends upward and downward along the data line 171 from the common voltage line 131, and a width of the ninth extension 138 may be larger than a width of the data line 171. The ninth extension 138 may partially overlaps the data line in a width direction of the data line 171. The ninth extension 138 may fully overlaps the data line in a width direction of the data line 171.

As such, when the ninth extension 138 overlapping the data line 171 is formed, coupling between the ninth extension 138 of the common voltage line 131 and the data line 171 is formed, and by the coupling, an effect of the coupling formed between the common electrode 270 overlapping the data line 171 and the data line 171 may be reduced. Accordingly, an effect of unnecessary coupling between the data line 171 and the common electrode 270 is reduced to thereby prevent deterioration of display quality due to the unnecessary coupling between the data line 171 and the common electrode 270.

Further, by forming the ninth extension 138 of the common voltage line 131 overlapping the data line 171, while a width of the light blocking member overlapping the data line 171 is formed to be small while preventing, light leakage at a portion adjacent to the data line 171.

Hereinabove, many features of the liquid crystal display according to the exemplary embodiment described with reference to FIGS. 1, 2A, 2B, and 3 may all be applied to the liquid crystal display according to the exemplary embodiment.

Figure 17:
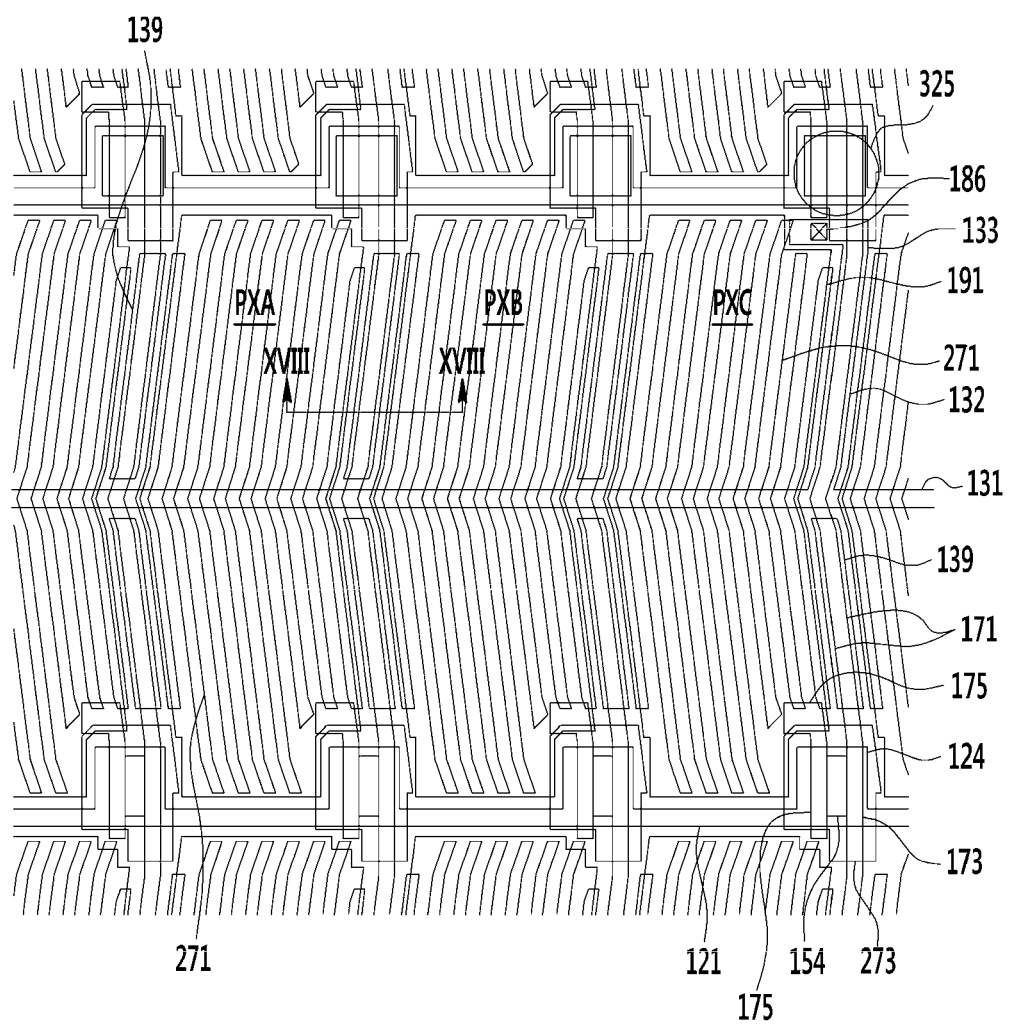
FIG. 17 is a layout view illustrating some pixels of a liquid crystal display according to another exemplary embodiment of the present invention.

A liquid crystal display according to another exemplary embodiment of the present invention will be described with reference to FIGS. 17 and 18. FIG. 17 is a layout view illustrating some pixels of a liquid crystal display according to another exemplary embodiment of the present invention, and FIG. 18 is a cross-sectional view of the liquid crystal display of FIG. 17 taken along line XVIII-XVIII.

Figure 18:
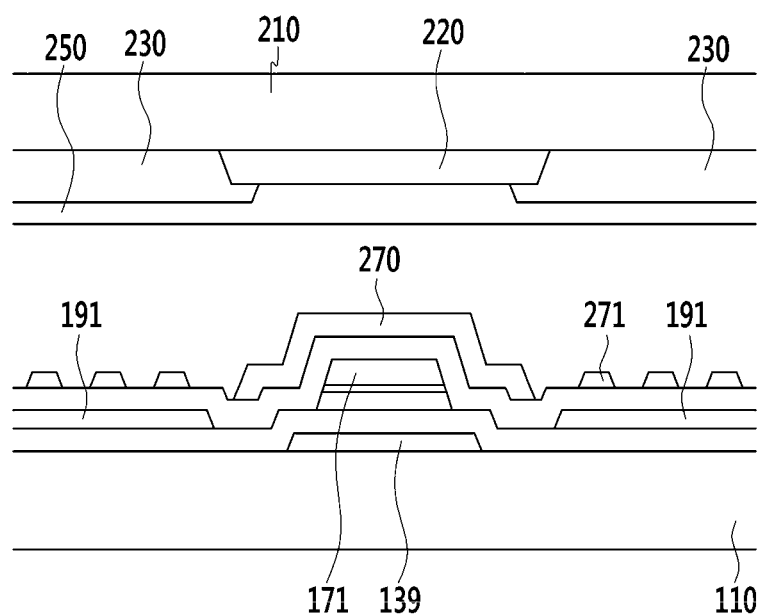
FIG. 18 is a cross-sectional view of the liquid crystal display of FIG. 17 taken along line XVIII-XVIII.

Referring to FIGS. 17 and 18, the liquid crystal display according to the exemplary embodiment is similar to the liquid crystal display according to the exemplary embodiment described with reference to FIGS. 1, 2A, and 2B. A detailed description for like constituent elements is omitted.

The liquid crystal display according to the exemplary embodiment of the present invention includes a plurality of pixels PXA, PAB, and PXC adjacent to each other.

The plurality of pixels PXA, PAB, and PXC includes a gate line 121, a common voltage line 131, a plurality of data lines 171, a pixel electrode 191, and a common electrode 270.

The common voltage line 131 has a protrusion 133, and the protrusion 133 of the common voltage line 131 overlapping a common contact hole 186 for connecting the common voltage line 131 with the common electrode 270. The contact hole 186 is formed to be adjacent to a column spacer 325.

By forming the contact hole 186 to be adjacent to the column spacer 325, the contact hole 186 may be covered by a light blocking member 220 overlapping the column spacer 325. Accordingly, an additional light blocking member for covering the common contact hole 186 which connects the common voltage line 131 and the common electrode 270 may not be required. Therefore, without deteriorating the aperture ratio of the liquid crystal display, the common contact hole 186 for connecting the common voltage line 131 and the common electrode 270 to each other may be formed.

The column spacer 325 serves to uniformly control a gap between two substrates facing each other, that is, a cell gap.

The protrusion 133 of the common voltage line 131, the common contact hole 186, and the column spacer 325 may be formed for every two or more dots and every six or more pixels along a row direction and along a column direction. In detail, the protrusion 133 of the common voltage line 131, the common contact hole 186, and the column spacer 325 may be formed for every six or more pixels along a row direction and along a column direction.

As such, by forming one protrusion 133 of the common voltage line 131 for every two or more dots and every six or more pixels along a row direction and along a column direction, an aperture ratio of the liquid crystal display may be prevented from deteriorating due to the common contact hole 186 for connecting the common voltage line 131 and the common electrode 270. The column spacer 325 is formed at a position overlapping the thin film transistor. However, in a process of forming the column spacer 325, the column spacer 325 may be formed at another adjacent position other than a desired position due to a misalignment, and the position of the column spacer 325 may be changed into an adjacent region by external pressure. Accordingly, a width of the light blocking member overlapping the column spacer 325 is formed to be larger than a width of the column spacer 325. According to the liquid crystal display of the exemplary embodiment of the present invention, the common contact hole 186 for connection between the protrusion 133 of the common voltage line 131 and the common electrode 270 is formed to be adjacent to the column spacer 325, and as a result, the contact hole 186 may be covered by the light blocking member overlapping the column spacer 325. Accordingly, even though an additional light blocking member for covering the common contact hole 186 which connects the common voltage line 131 and the common electrode 270 is not formed, the common contact hole 186 may be covered by the light blocking member 220. Therefore, without deteriorating the aperture ratio of the liquid crystal display, the common contact hole 186 for connecting the common voltage line 131 and the common electrode 270 may be formed.

Referring to FIGS. 17 and 18, unlike the liquid crystal display according to the exemplary embodiment described with reference to FIGS. 1, 2A, and 2B, the liquid crystal display according to the exemplary embodiment further includes a blocking layer 139 which is formed on the same layer as the common voltage line 131 and overlapping the data line 171.

The blocking layer 139 extends upward and downward along the data line 171. The blocking layers 139 are disconnected from the common voltage line. The protrusion 133 extends upward and may overlap the data line 171 in a width direction of the data line 171. The protrusion 133 may fully overlap the data line 171 in a width direction of the data line 171.

As such, by forming the blocking layer 139 overlapping the data line 171, while a width of the light blocking member overlapping the data line 171 is formed to be small, light leakage which may be generated at a portion adjacent to the data line 171 may be prevented.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

What is claimed is:

1. A liquid crystal display, comprising:
a first substrate;
a gate line, a data line, and a common voltage line formed on the first substrate;
a first passivation layer formed on the gate line, the data line, and the common voltage line; and
a pixel electrode and a common electrode formed on the first passivation layer and overlapping each other with a second passivation layer therebetween,
wherein the common electrode is connected to the common voltage line through common contact holes, and
the common contact holes are disposed only for every two or more dots, wherein each dot comprises three pixels in a row.

2. The liquid crystal display of claim 1, further comprising:
a second substrate facing the first substrate; and
column spacers maintaining a cell gap between the first substrate and the second substrate,
wherein the common contact holes are formed to be adjacent to the column spacers.

3. The liquid crystal display of claim 2, further comprising:
light blocking members overlapping the column spacers,
wherein the common contact holes overlap the light blocking members.

4. The liquid crystal display of claim 3, wherein:
the common voltage line is disposed between two gate lines adjacent to each other, and
distances between the common voltage line and the two gate lines are substantially the same as each other.

5. The liquid crystal display of claim 4, wherein:
the common voltage line includes protrusions exposed by the common contact holes,
the data line includes a plurality of data lines and the common voltage line includes a plurality of common voltage lines, and
the extensions of the common voltage lines formed in adjacent pixel rows overlap different data lines.

6. The liquid crystal display of claim 5, wherein:
the common voltage line includes a first extension and a second extension extending to be parallel to the data line,
the first extension is disposed at a left side of the data line, and
the second extension is disposed at a right side of the data line.

7. The liquid crystal display of claim 6, wherein:
the common voltage line further includes a third extension and a fourth extension extending to be parallel to the data line,
the first extension and the third extension are disposed at the left side of the data line,
the second extension and the fourth extension are disposed at the right side of the data line,
the first extension and the second extension extend upward along the data line from the common voltage line, and
the third extension and the fourth extension extend downward along the data line from the common voltage line.

8. The liquid crystal display of claim 7, wherein:
the first extension, the second extension, the third extension and the fourth extension have a bent portion.

9. The liquid crystal display of claim 6, wherein:
the first extension extends upward or downward along the data line from the common voltage line, and
the second extension extends in an opposite direction to the extending direction of the first extension.

10. The liquid crystal display of claim 5, wherein:
the common voltage line further includes a connection portion extending toward the common contact hole, and
the connection portion includes a first vertical portion disposed at a left side of the data line, a second vertical portion disposed at a right side of the data line, and a horizontal portion connecting the first vertical portion and the second vertical portion.

11. The liquid crystal display of claim 5, wherein:
the common voltage line includes a first extension and a second extension extending to be parallel to the data line,
widths of the first extension and the second extension are larger than a width of the data line,
the first extension extends upward or downward along the data line from the common voltage line,
the second extension extends in an opposite direction to the extending direction of the first extension, and
the common voltage line overlaps the data.

12. The liquid crystal display of claim 5, further comprising:
a blocking layer overlapping the data line, floated, and formed on the same layer as the common voltage line,
wherein a width of the blocking layer is larger than a width of the data line, and
the common voltage line overlaps the data.

13. The liquid crystal display of claim 3, wherein:
the common voltage line includes a first extension and a second extension extending to be parallel to the data line,
the first extension is disposed at a left side of the data line, and
the second extension is disposed at a right side of the data line.

14. The liquid crystal display of claim 13, wherein:
the common voltage line further includes a third extension and a fourth extension extending to be parallel to the data line,
the first extension and the third extension are disposed at the left side of the data line,
the second extension and the fourth extension are disposed at the right side of the data line,
the first extension and the second extension extend upward along the data line from the common voltage line, and
the third extension and the fourth extension extend downward along the data line from the common voltage line.

15. The liquid crystal display of claim 14, wherein:
the first extension, the second extension, the third extension and the fourth extension have a bent portion.

16. The liquid crystal display of claim 15, wherein:
the first extension extends upward or downward along the data line from the common voltage line, and
the second extension extends in an opposite direction to the extending direction of the first extension.

17. The liquid crystal display of claim 3, wherein:
the common voltage line further includes a connection portion extending toward the common contact hole, and
the connection portion includes a first vertical portion disposed at a left side of the data line, a second vertical portion disposed at a right side of the data line, and a horizontal portion connecting the first vertical portion and the second vertical portion.

18. The liquid crystal display of claim 3, wherein:
the common voltage line includes a first extension and a second extension extending to be parallel to the data line, widths of the first extension and the second extension are larger than a width of the data line, the first extension extends upward or downward along the data line from the common voltage line, the second extension extends in an opposite direction to the extending direction of the first extension, and the common voltage line overlaps the data line.

19. The liquid crystal display of claim 3, further comprising:

a blocking layer overlapping the data line, floated, and formed on the same layer as the common voltage line, wherein a width of the blocking layer is larger than a width of the data line.

20. The liquid crystal display of claim 1, wherein:

the common voltage line includes a first extension and a second extension extending to be parallel to the data line, the first extension is disposed at a left side of the data line, and the second extension is disposed at a right side of the data line.

21. The liquid crystal display of claim 20, wherein:

the common voltage line further includes a third extension and a fourth extension extending to be parallel to the data line, the first extension and the third extension are disposed at the left side of the data line, the second extension and the fourth extension are disposed at the right side of the data line, the first extension and the second extension extend upward along the data line from the common voltage line, and the third extension and the fourth extension extend downward along the data line from the common voltage line.

22. The liquid crystal display of claim 21, wherein:

the first extension, the second extension, the third extension and the fourth extension have a bent portion.

23. The liquid crystal display of claim 22, wherein:

the first extension extends upward or downward along the data line from the common voltage line, and the second extension extends in an opposite direction to the extending direction of the first extension.

24. The liquid crystal display of claim 1, wherein:

the common voltage line further includes a connection portion extending toward the common contact hole, and the connection portion includes a first vertical portion disposed at a left side of the data line, a second vertical portion disposed at a right side of the data line, and a horizontal portion connecting the first vertical portion and the second vertical portion.

25. The liquid crystal display of claim 1, wherein:

the common voltage line includes a first extension and a second extension extending to be parallel to the data line, widths of the first extension and the second extension are larger than a width of the data line, the first extension extends upward or downward along the data line from the common voltage line, the second extension extends in an opposite direction to the extending direction of the first extension, and the common voltage line overlaps the data line.

26. The liquid crystal display of claim 1, further comprising:

a blocking layer overlapping the data line, floated, and formed on the same layer as the common voltage line, wherein a width of the blocking layer is larger than a width of the data line.

27. The liquid crystal display of claim 1, further comprising a first extension disposed on a first side of the data line and disposed between the data line and the pixel electrode, wherein the first extension includes a connecting portion extending substantially parallel to the data line and overlapping the data line, and a protrusion formed on an end portion of the first extension and exposed by the common contact hole, the protrusion being formed adjacent to a column spacer.

28. The liquid crystal display of claim 27, further comprising a second extension disposed on a second side of the data line and extending opposite direction to the first extension, wherein the second extension extends substantially parallel to the data line and overlapping the data line.

* * * * *